(12) United States Patent  
Chun et al.

(10) Patent No.: US 11,941,930 B2
(45) Date of Patent: Mar. 26, 2024

(54) DOOR LOCK, DEVICE FOR CONTROLLING DOOR LOCK, PROGRAM FOR CONTROLLING DOOR LOCK AND SERVER FOR MANAGING DOOR LOCK

(71) Applicant: PSDL, Seongnam-si (KR)

(72) Inventors: Sungwoo Chun, Sejong-si (KR); Deok Soo Hwang, Suwon-si (KR)

(73) Assignee: PSDL, Seongnam-si (KR)

( * ) Notice: Subject to any disclaimer, the term of this patent is extended or adjusted under 35 U.S.C. 154(b) by 287 days.

(21) Appl. No.: 17/459,791

(22) Filed: Aug. 27, 2021

(65) Prior Publication Data
US 2022/0207938 A1    Jun. 30, 2022

(30) Foreign Application Priority Data

Dec. 30, 2020 (KR) .................. 10-2020-0187897

(51) Int. Cl.
*H04L 9/08* (2006.01)
*G07C 9/00* (2020.01)
*H04L 9/30* (2006.01)

(52) U.S. Cl.
CPC ..... *G07C 9/00817* (2013.01); *G07C 9/00309* (2013.01); *G07C 9/00571* (2013.01); *G07C 9/00904* (2013.01); *H04L 9/088* (2013.01); *H04L 9/30* (2013.01); *G07C 2009/00412* (2013.01)

(58) Field of Classification Search
CPC ............ G07C 9/00817; G07C 9/00309; G07C 9/00571; G07C 9/00904; G07C 2009/00412; G07C 2009/005; H04L 9/088; H04L 9/30; H04L 9/0841; H04L 2209/805; H04L 9/0866; H04L 9/0825; H04L 9/0869; H04W 12/069; H04W 12/71; E05B 2047/0067
See application file for complete search history.

(56) References Cited

U.S. PATENT DOCUMENTS

| | | | |
|---|---|---|---|
| 11,568,694 B2* | 1/2023 | Shila | .................. G06F 16/27 |
| 2006/0274856 A1* | 12/2006 | Dunn | .................. H04L 63/045 |
| | | | 375/316 |
| 2007/0176739 A1* | 8/2007 | Raheman | ........... G07C 9/00904 |
| | | | 713/176 |

(Continued)

FOREIGN PATENT DOCUMENTS

| | | | |
|---|---|---|---|
| CN | 205140035 U | * | 4/2016 |
| KR | 20090020796 A | | 2/2009 |

(Continued)

*Primary Examiner* — Khalid M Almaghayreh
(74) *Attorney, Agent, or Firm* — STIP Law Group, LLC

(57) ABSTRACT

Provided is a door lock. The door lock includes a door lock body installed on a door and having an opening/closing device; a memory to store a door lock identifier including a door recognition code and a door lock ID corresponding to the door recognition code; an antenna to sequentially receive a first RF signal and a second RF signal from a reader; and a control unit configured to transmit the door recognition code to the reader and configured to determine whether the door lock ID provided from the door lock management server through the reader matches the previously assigned door lock ID of the door lock identifier to control the opening/closing device.

19 Claims, 24 Drawing Sheets

(56) References Cited

U.S. PATENT DOCUMENTS

| | | | | |
|---|---|---|---|---|
| 2010/0250637 A1* | 9/2010 | Shim | G06F 7/58 | 708/250 |
| 2015/0045013 A1* | 2/2015 | Simmons | H04W 4/80 | 455/420 |
| 2016/0036788 A1* | 2/2016 | Conrad | H04W 12/08 | 713/168 |
| 2016/0036814 A1* | 2/2016 | Conrad | H04L 9/0891 | 713/171 |
| 2016/0042581 A1* | 2/2016 | Ku | G07C 9/00309 | 340/5.61 |
| 2016/0078699 A1* | 3/2016 | Kalb | G07C 9/00571 | 340/5.6 |
| 2016/0368455 A1* | 12/2016 | Kim | B60R 25/23 | |
| 2019/0020636 A1* | 1/2019 | Gehring | H04L 9/0833 | |
| 2019/0333304 A1* | 10/2019 | Flynn | G06Q 20/327 | |
| 2019/0340856 A1* | 11/2019 | Gilbert | E05B 47/0012 | |
| 2019/0372763 A1* | 12/2019 | Yang | H04L 9/0847 | |
| 2021/0351920 A1* | 11/2021 | Tang | H04L 9/0825 | |
| 2023/0283466 A1* | 9/2023 | Suzuki | H04L 9/0891 | 713/167 |

FOREIGN PATENT DOCUMENTS

| | | |
|---|---|---|
| KR | 101480880 B1 * | 1/2015 |
| KR | 101554959 B1 | 9/2015 |
| KR | 20150131597 A | 11/2015 |
| KR | 20150134806 A | 12/2015 |
| KR | 20170026920 A | 3/2017 |
| KR | 20190044375 A | 4/2019 |
| KR | 20190085204 A | 7/2019 |
| KR | 20190143039 A | 12/2019 |
| KR | 20200052434 A | 5/2020 |

* cited by examiner

【Fig. 1】
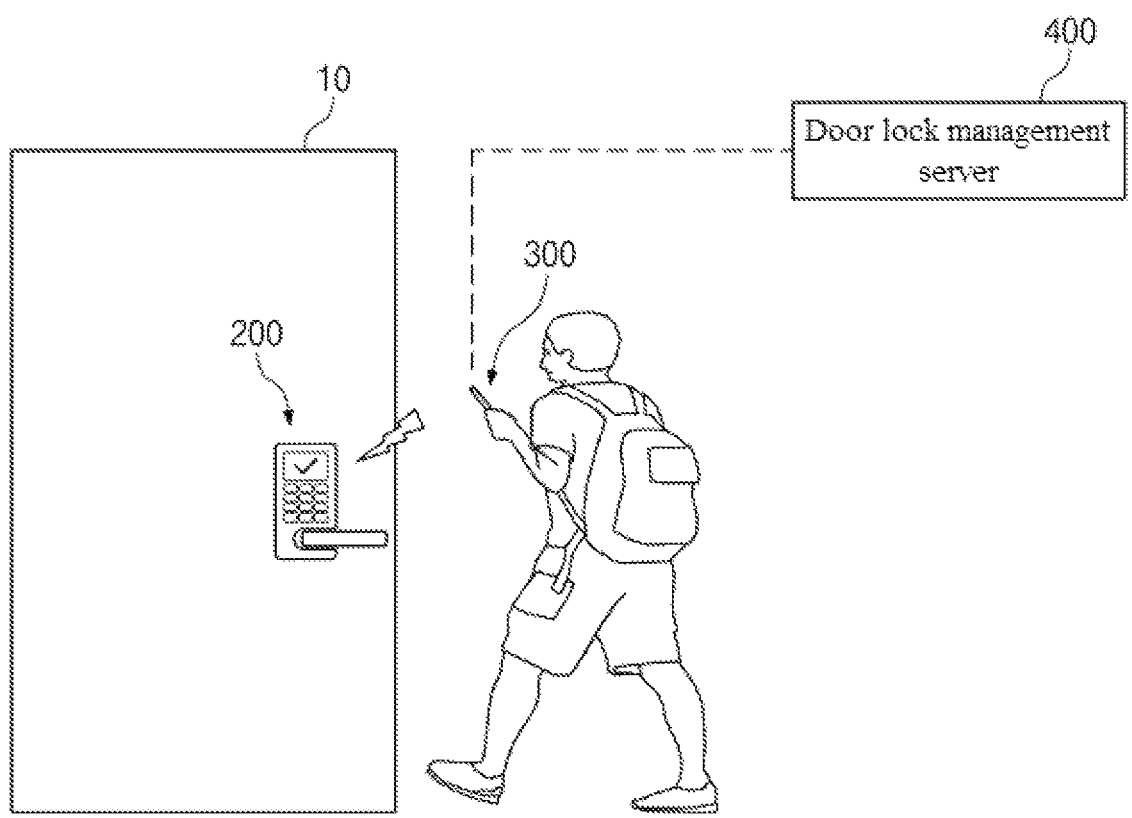

[Fig. 2]
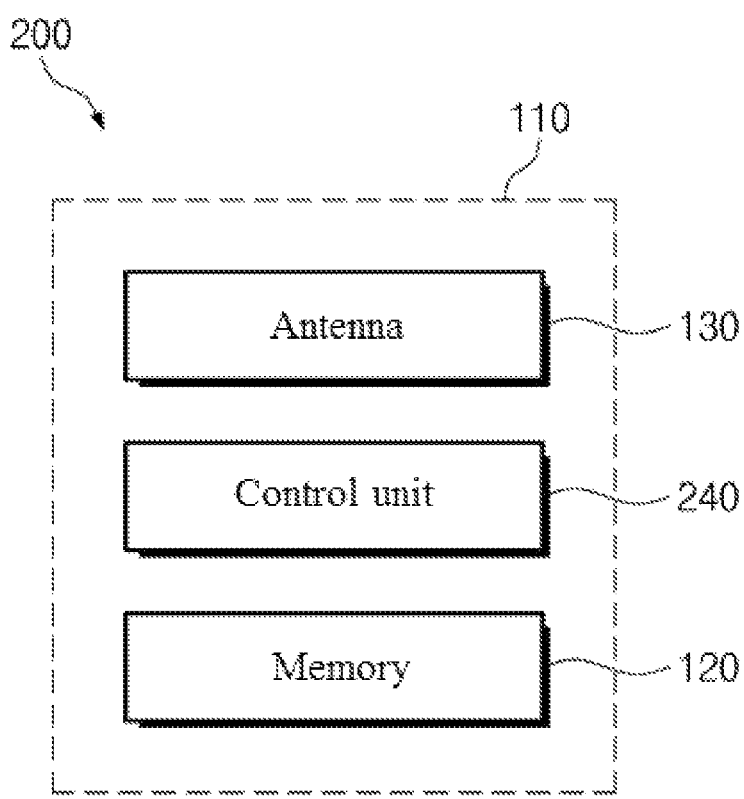

[Fig. 3]
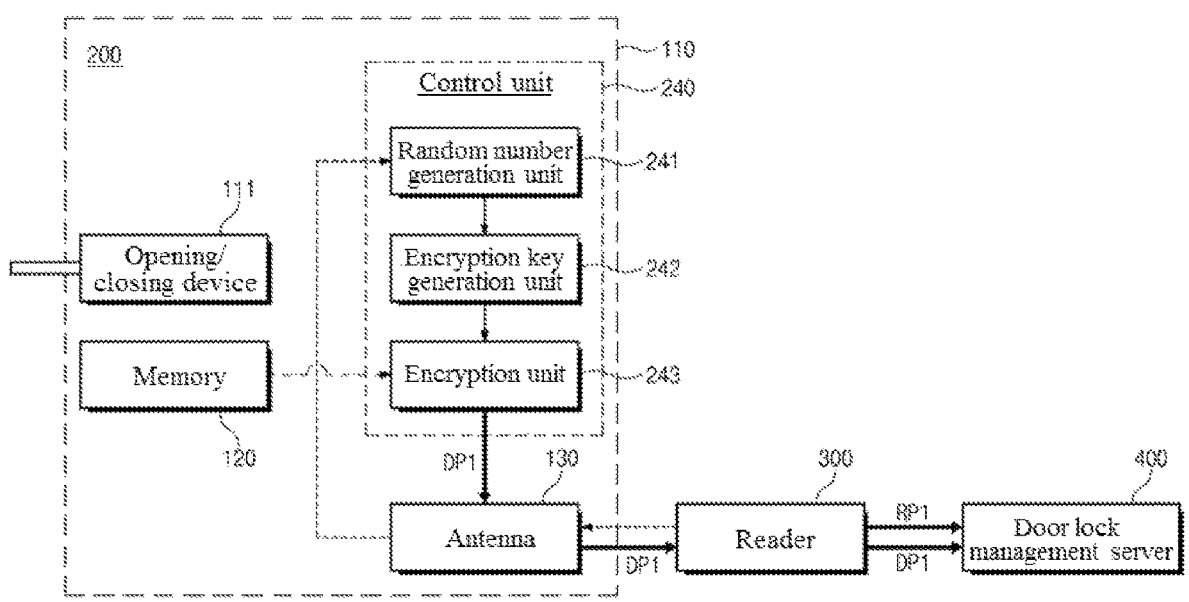

[Fig. 4]
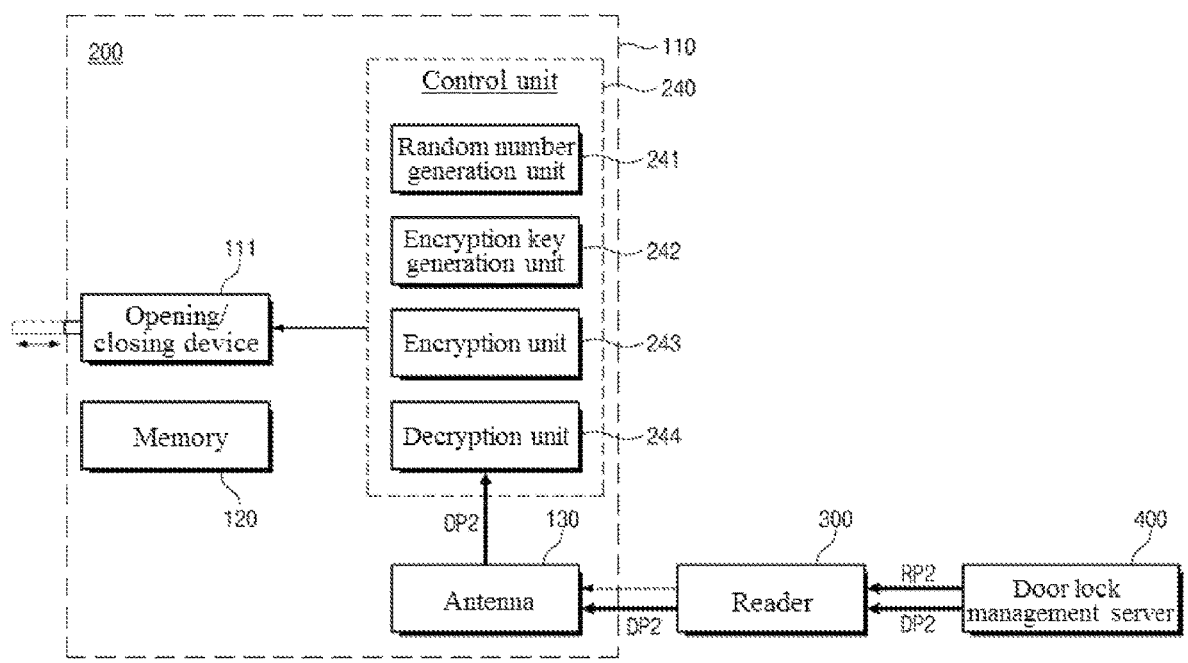

[Fig. 5]
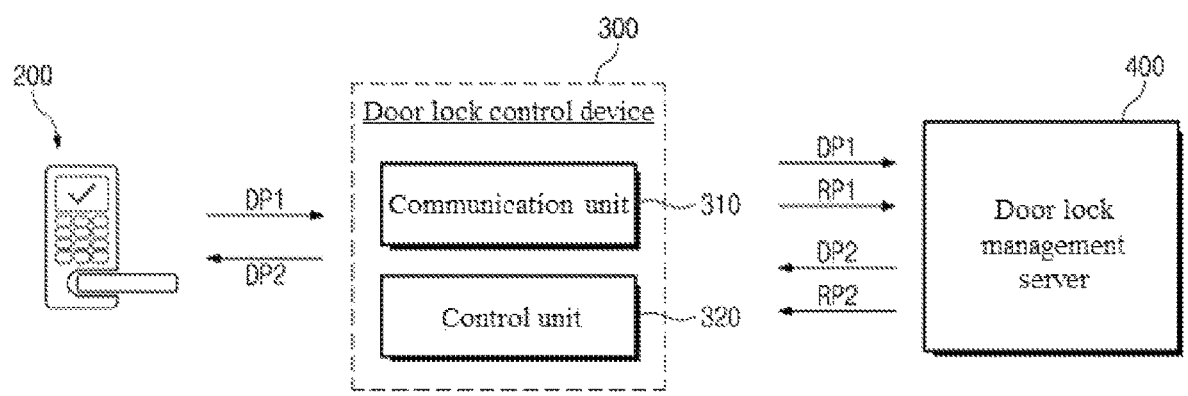

[Fig. 6]
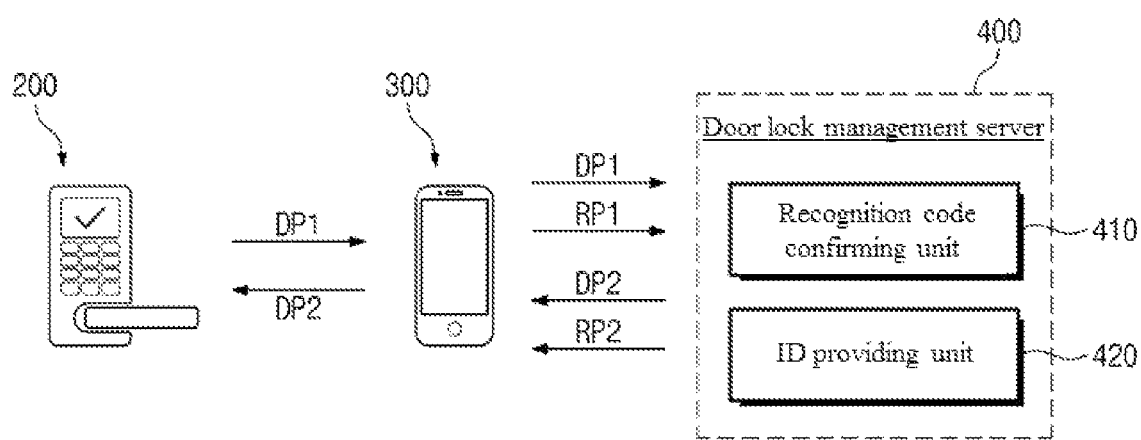

[Fig. 7]
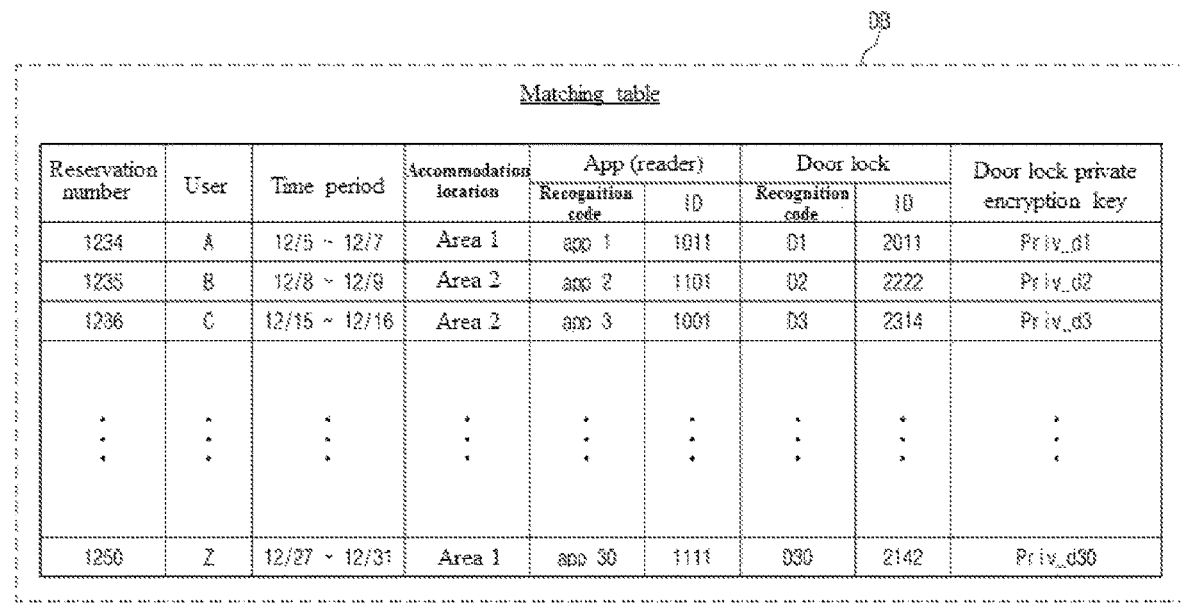

[Fig. 8]
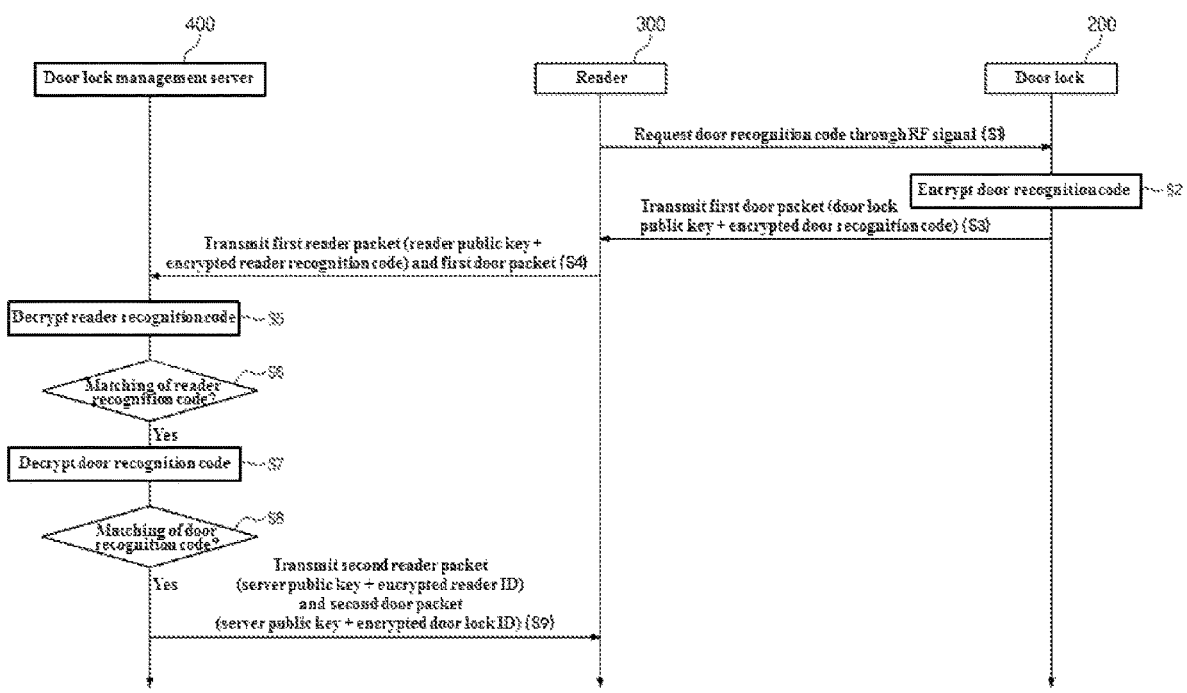

[Fig. 9]
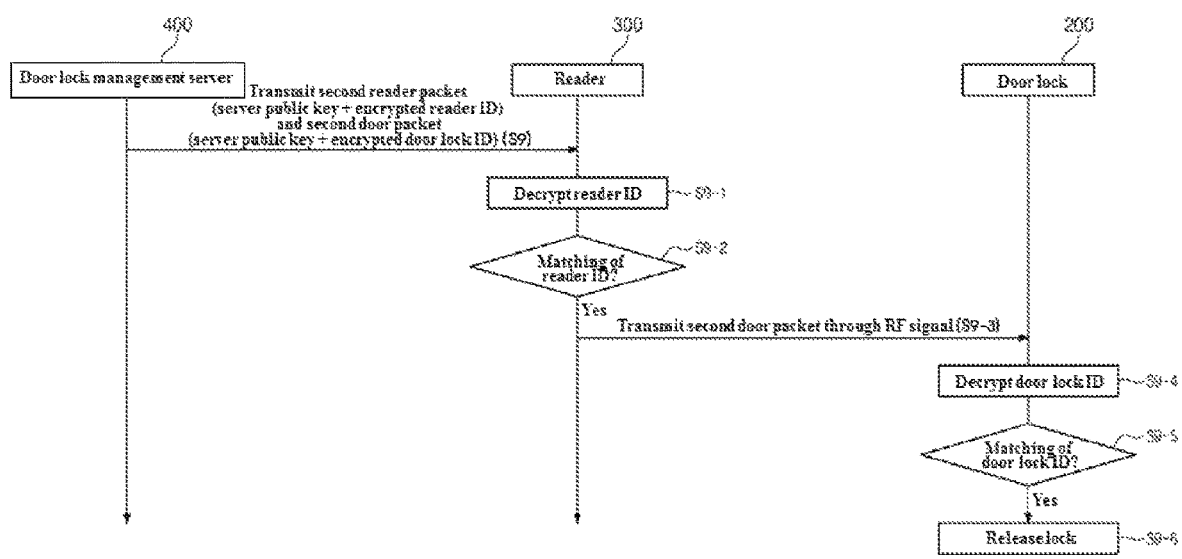

[Fig. 10]
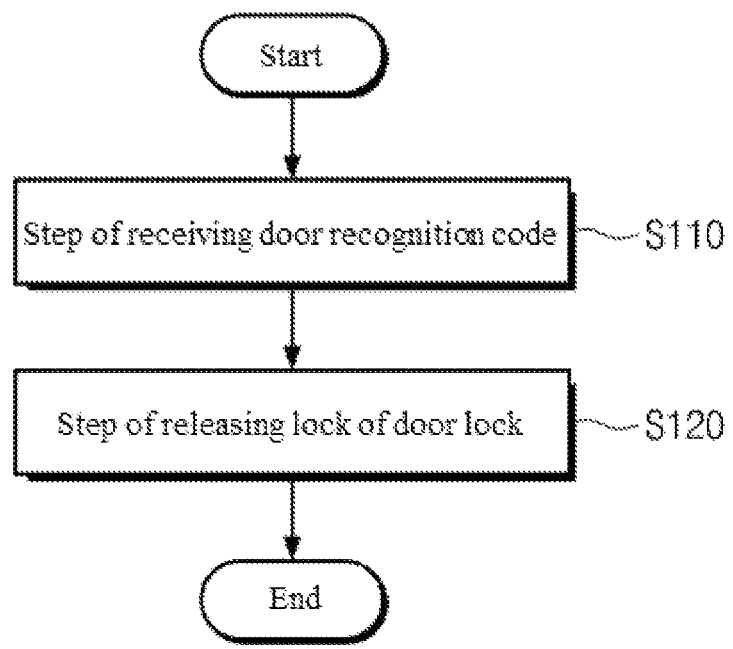

[Fig. 11]
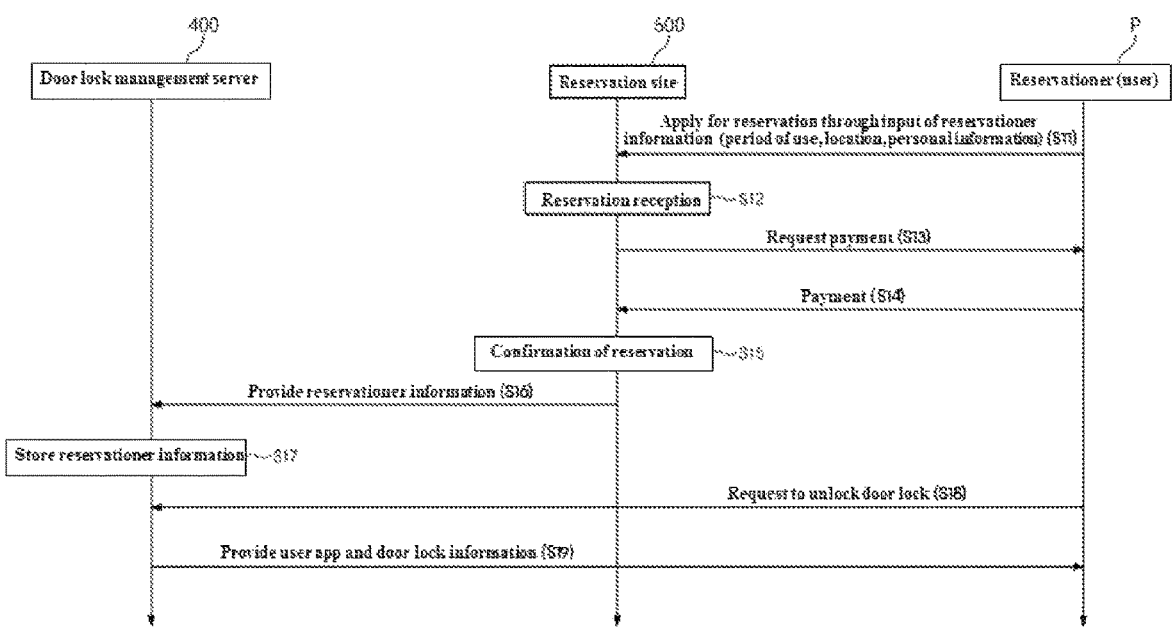

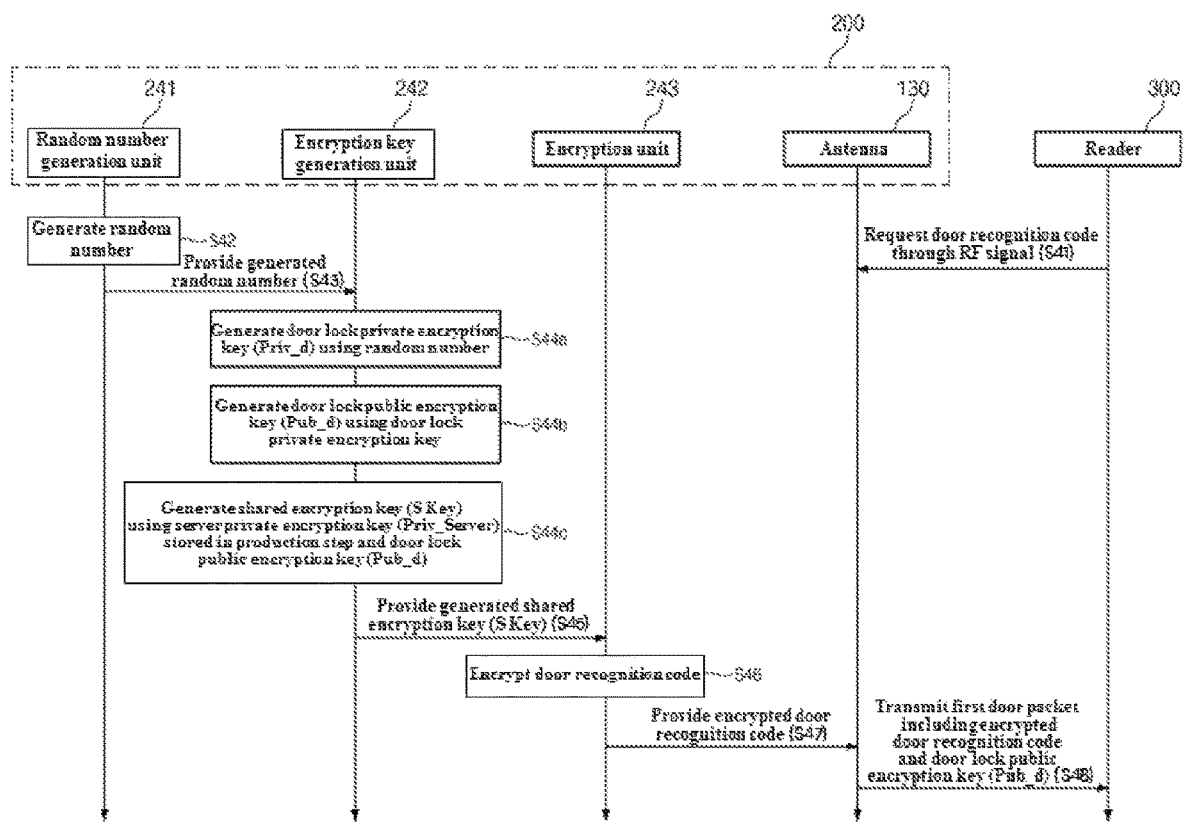
[Fig. 12]

[Fig. 13]
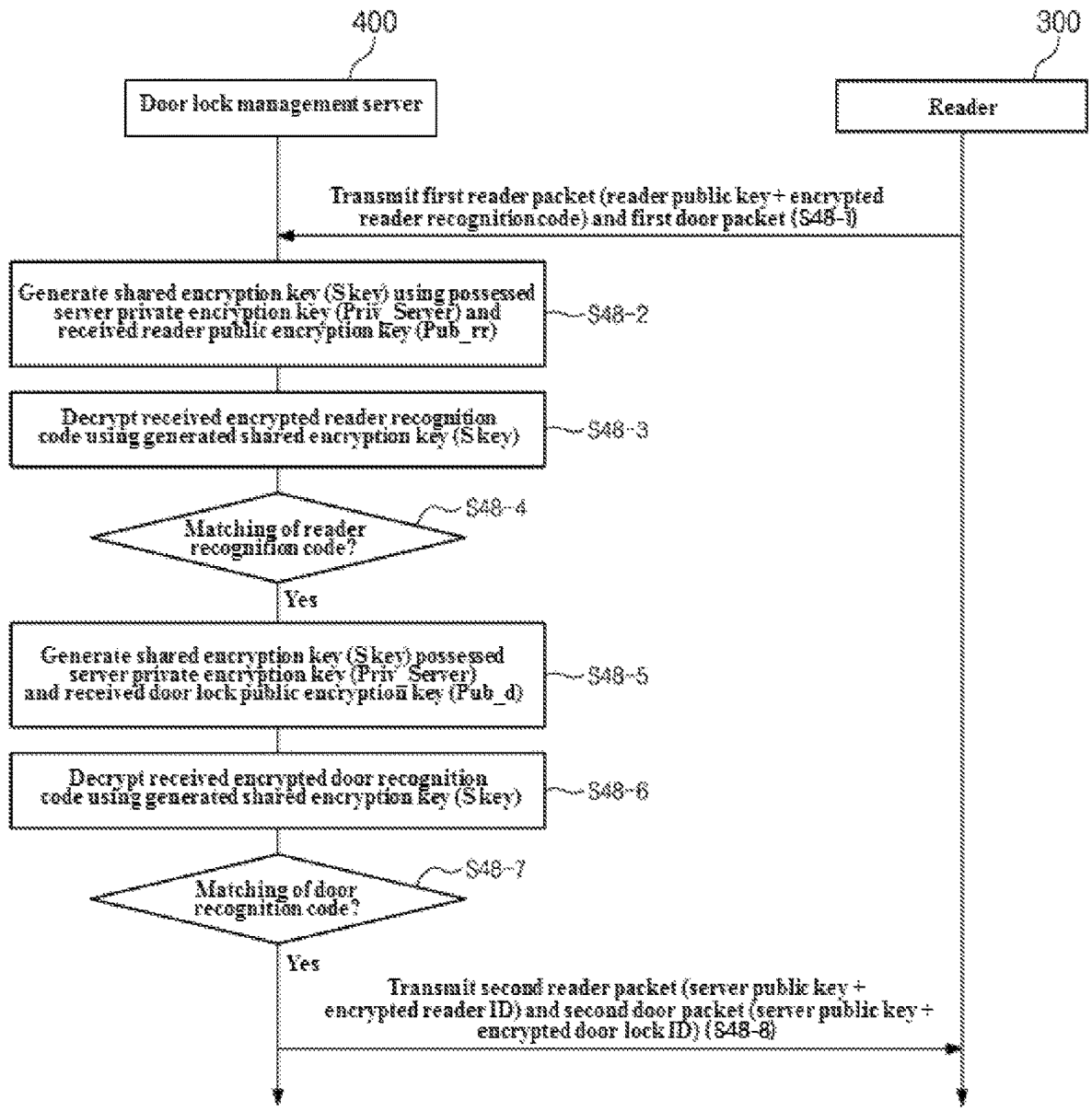

[Fig. 14]
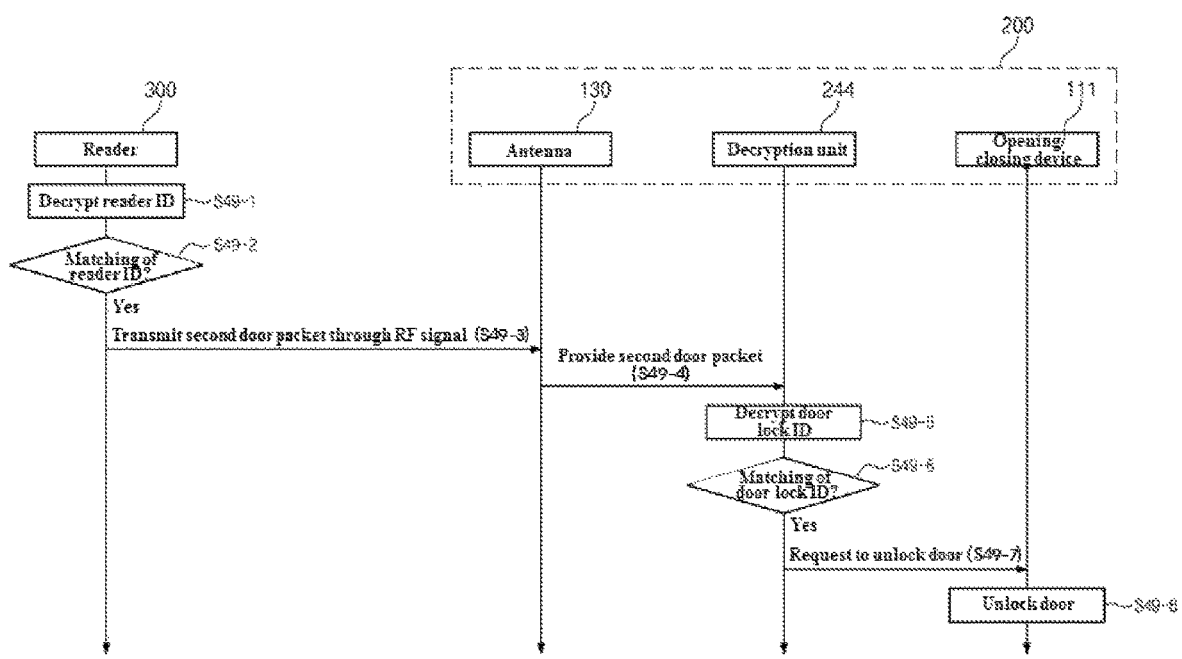

[Fig. 15]
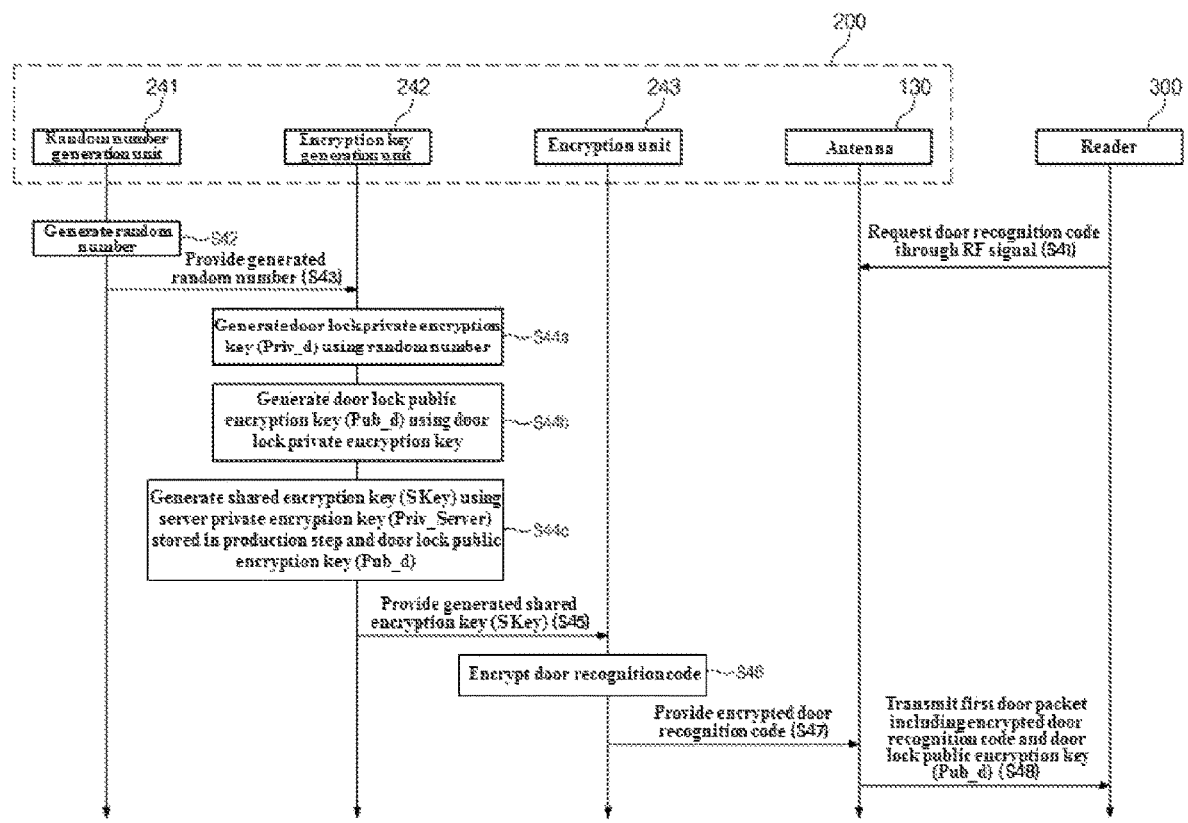

[Fig. 16]
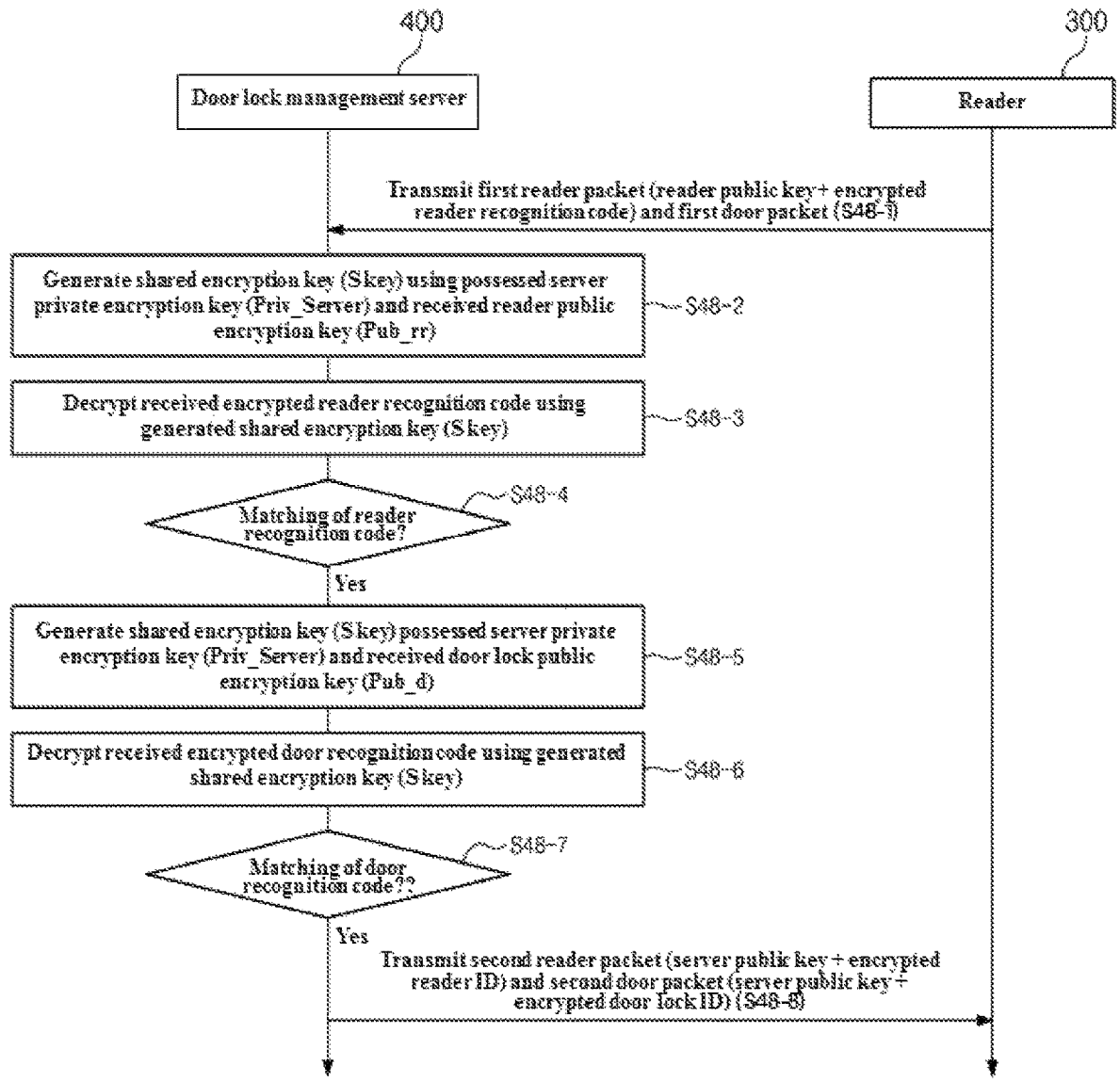

[Fig. 17]
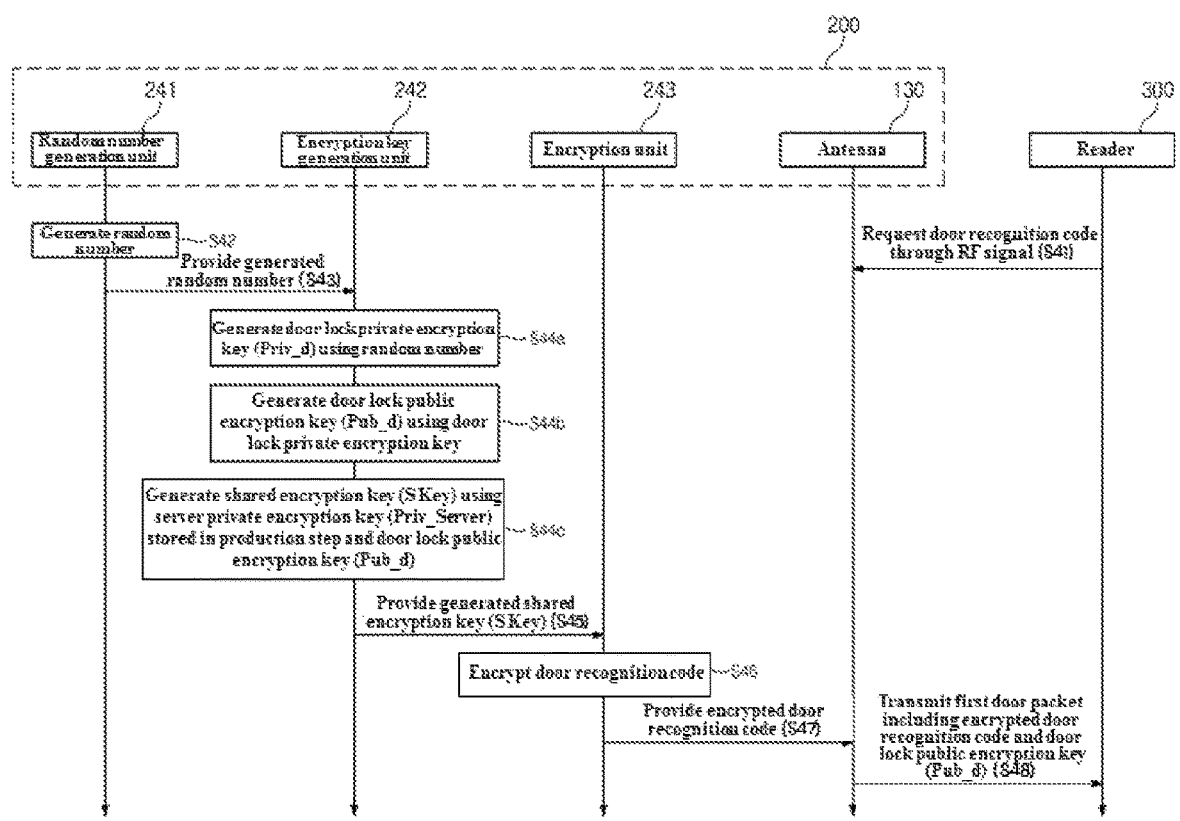

[Fig. 18]
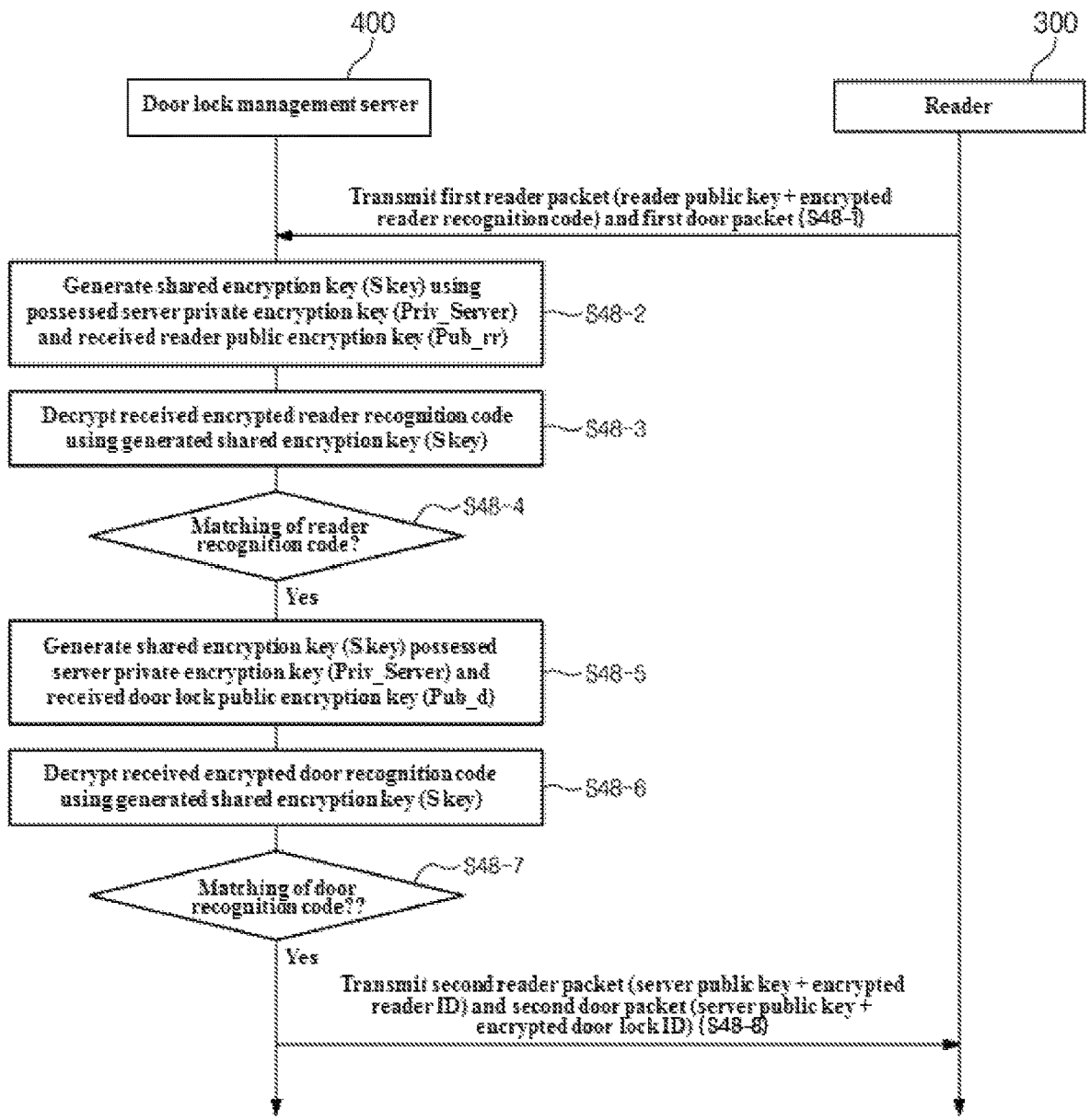

[Fig. 19]
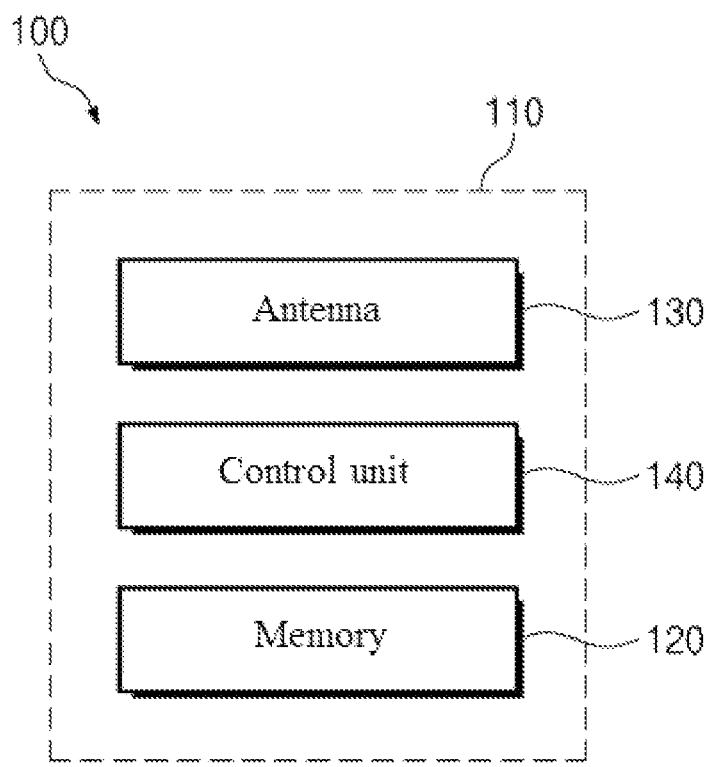

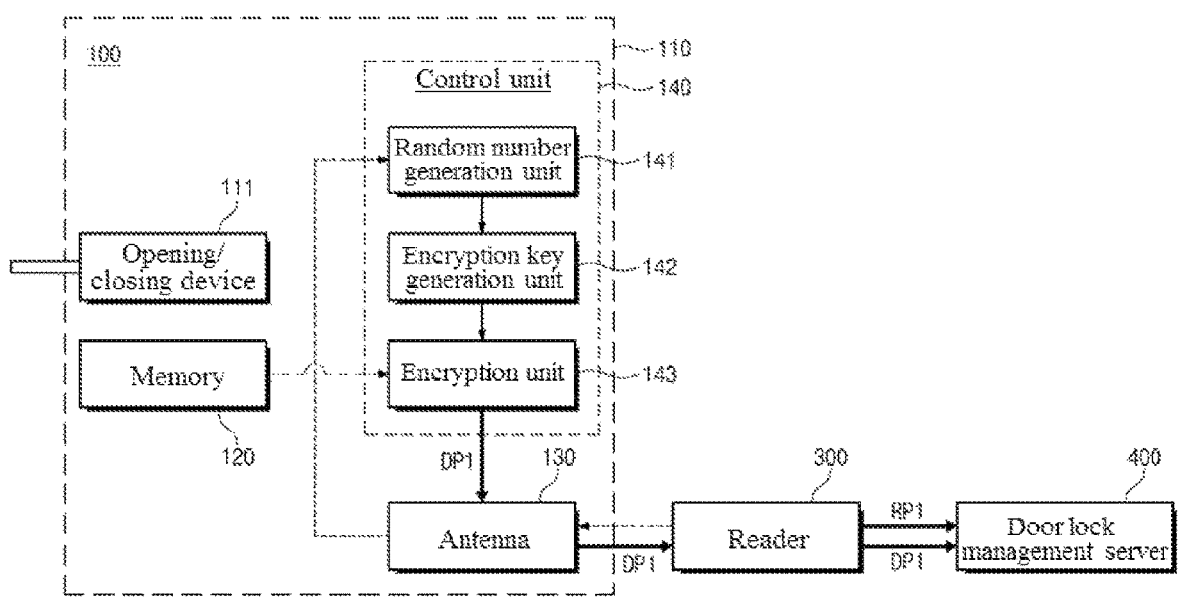
[Fig. 20]

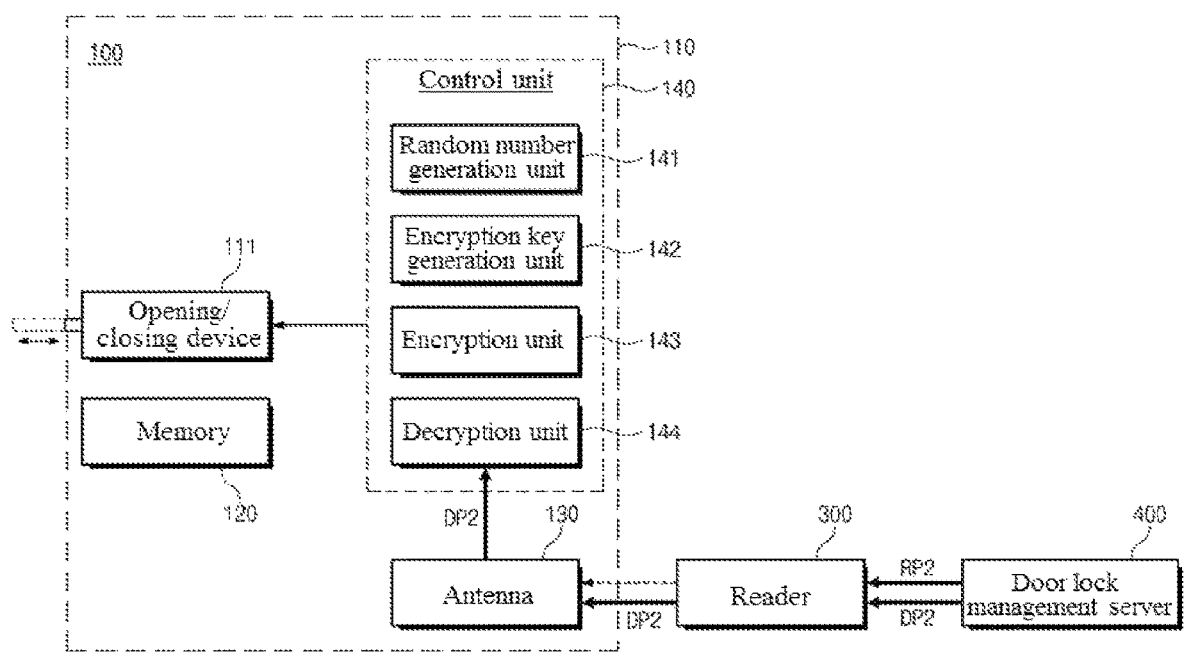
[Fig. 21]

[Fig. 22]
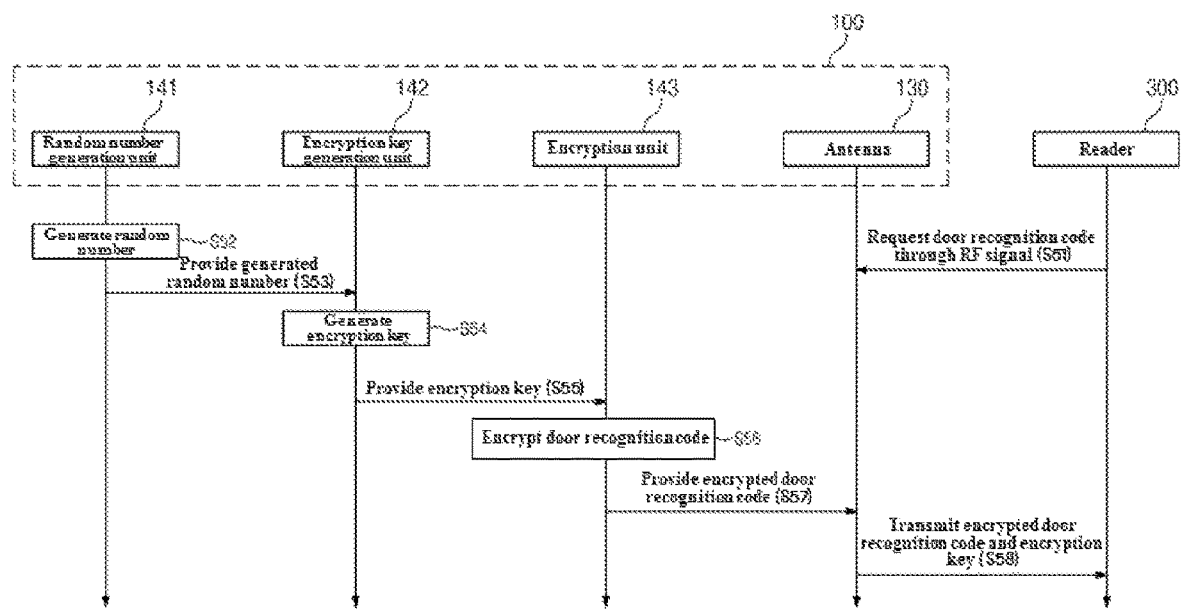

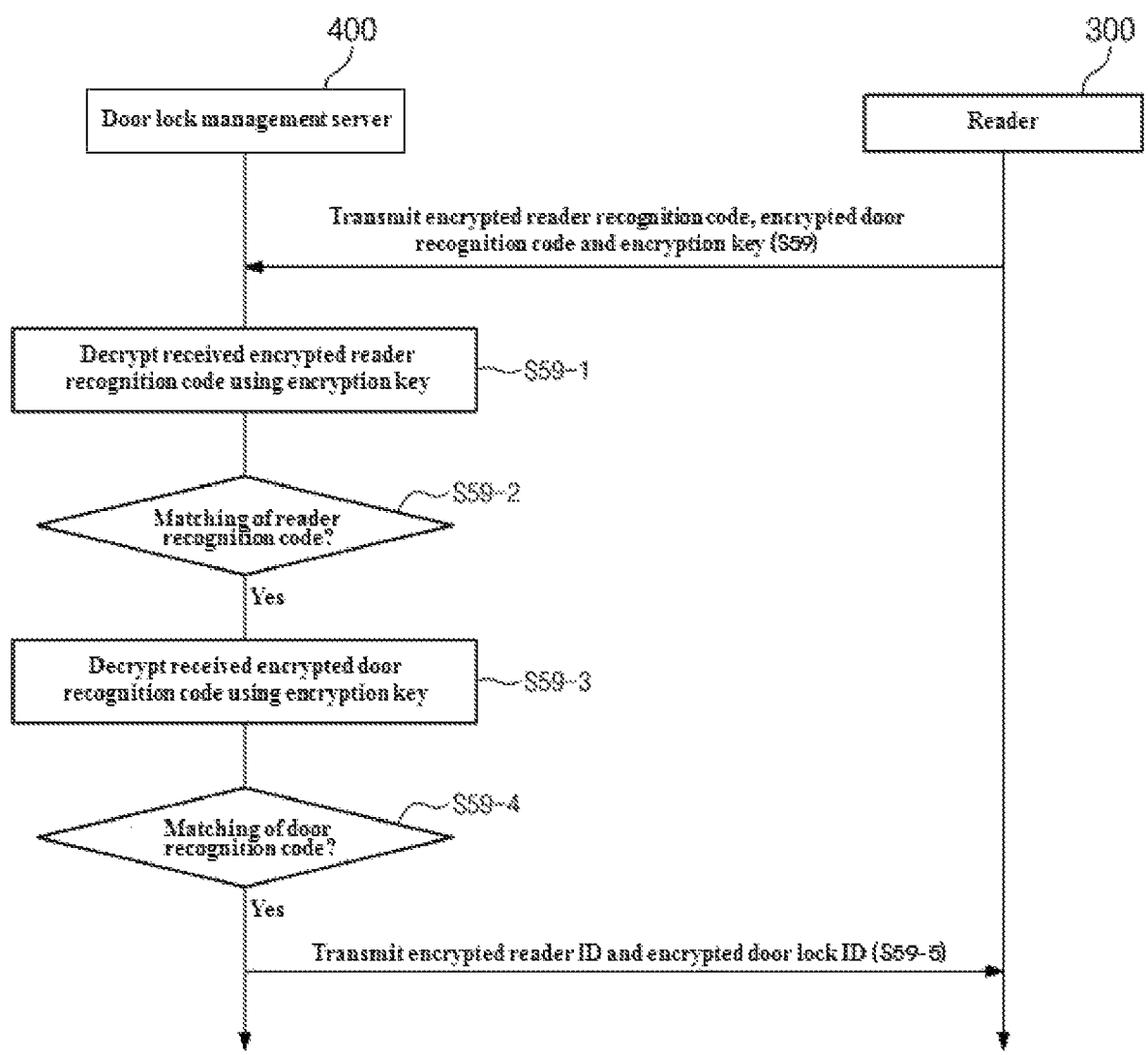

[Fig. 24]
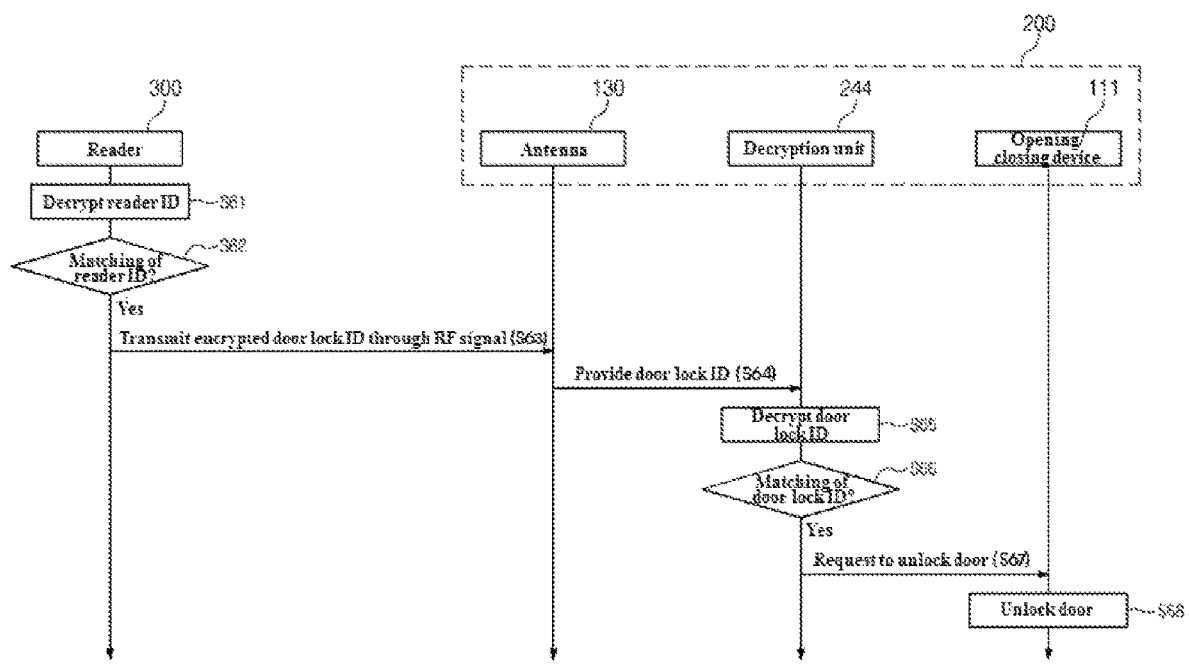

DOOR LOCK, DEVICE FOR CONTROLLING DOOR LOCK, PROGRAM FOR CONTROLLING DOOR LOCK AND SERVER FOR MANAGING DOOR LOCK

CROSS-REFERENCE TO RELATED APPLICATIONS

This application claims the priority of the Korean Patent Applications NO 10-2020-0187897 filed on Dec. 30, 2020, in the Korean Intellectual Property Office, the disclosure of which is incorporated herein by reference.

BACKGROUND OF THE INVENTION

1. Field of the Invention

The present invention relates to a door lock, a device for controlling the door lock, a program for controlling the door lock, and a server for managing the door lock, and more particularly, to a door lock having a strong security function, a device for controlling the door lock, a program for controlling the door lock, and a server for managing the door lock.

2. Description of the Related Art

In recent years, in order to block the intrusion of outsiders who are not permitted to enter the door of a place such as a house, apartment, or office, and for easy entry and exit of insiders, most conventional locks are being replaced with digital door locks.

Meanwhile, when the accommodation sharing service is provided online, the guest enters the room by receiving the password for the door lock installed on the door of the room through a mobile phone without meeting with the owner. Due to such excellent convenience and the reason that privacy is not exposed, online accommodation sharing services have been used a lot recently, and the number of people renting their own houses as accommodation facilities has increased.

However, when the stay period has elapsed, the landlord has the inconvenience of having to re-set the password or key every time after moving out.

Meanwhile, in the case of a company or institution where security is important, access to a specific security area is restricted according to an individual security level.

In this case, in order for an employee or an outsider with a low security level to access a specific security area, the security manager has to check the security level every time and grant access.

SUMMARY OF THE INVENTION

To solve the above-described problems, an object of the present invention is to provide a door lock having ease of use and strong security function, a device for controlling the door lock, a program for controlling the door lock, and a server for managing the door lock.

Another object of the present invention is to provide a door lock that can improve user convenience, a device for controlling the door lock, a program for controlling the door lock, and a server for managing the door lock.

The technical problem to be solved by the present invention is not limited to the above.

To achieve the objects, the present invention provides a door lock.

According to an embodiment, a door lock includes a door lock body installed on a door and having an opening/closing device for opening and closing the door; a memory embedded in the door lock body to store a door lock identifier including a door recognition code assigned to the door and a door lock ID matched with the door recognition code; an antenna provided in the door lock body to sequentially receive a first RF signal and a second RF signal from a reader; and a control unit configured to transmit the door recognition code to the reader through the antenna such that the door recognition code together with a reader recognition code previously assigned to the reader is authenticated by a door lock management server that is communicatively connected with the reader when receiving the first RF signal, and configured to determine whether the door lock ID provided from the door lock management server through the reader matches the previously assigned door lock ID of the door lock identifier when receiving the second RF signal to control the opening/closing device such that the door is maintained in a lock state or released from the lock state.

According to a first embodiment, the memory may further store a server private encryption key (Priv_Server), wherein the control unit may include a random number generation unit configured to newly generate a random number based on the first RF signal to encrypt the door recognition code whenever the first RF signal is received; an encryption key generation unit configured to generate a door lock private encryption key (Priv-d) by using the random number generated from the random number generation unit, generate a door lock public encryption key (Pub_d) based on the door lock private encryption key (Priv_d), and generate a shared encryption key (S Key) by utilizing one of the door lock private encryption key (Priv-d) and the door lock public encryption key (Pub_d) and the server private encryption key (Priv_Server); and an encryption unit configured to encrypt the door recognition code stored in the memory by using the generated shared encryption key (S Key), and wherein, when receiving the first RF signal from the reader, the control unit is configured to generate the random number through the random number generation unit; generate the door lock private encryption key (Priv_d), the door lock public encryption key (Pub_d) and the shared encryption key (S Key) through the encryption key generation unit; encrypt the door recognition code with the shared encryption key (S Key) through the encryption unit; and transmit a first door packet including the encrypted door recognition code and the generated door lock public encryption key (Pub_d) to the reader through the antenna.

According to the first embodiment, the door lock management server that receives the first door packet from the reader is configured to decrypt the encrypted door recognition code by using the server private encryption key (Priv_Server) and the received door lock public encryption key (Pub_d).

According to the first embodiment, the door lock management server further receives a first reader packet including the encrypted reader identification code and a reader public encryption key (Pub_rr) from the reader, in which the door lock management server receives the first reader packet before receiving the first door packet, or simultaneously receives the first reader packet and the first door packet.

According to the first embodiment, the door lock management server is configured to decrypt the encrypted reader recognition code by using the server private encryption key (Priv_Server) and the received reader public encryption key (Pub_rr), and decrypt the encrypted door recognition code when it is determined that the decrypted reader recognition code matches a pre-stored reader recognition code.

According to the first embodiment, the door lock management server is configured to provide a second reader packet including a server public encryption key (Pub_Server) and an encrypted reader ID and a second door packet including a server public encryption key (Pub_Server) and an encrypted door lock ID to the reader, and wherein the reader is configured to decrypt the encrypted reader ID by using the server public encryption key (Pub_Server) and the reader private encryption key (Priv_rr), and transmit the second door packet to the antenna through the second RF signal during tagging when the decrypted reader ID matches a previously assigned reader ID.

According to the first embodiment, the control unit is configured to decrypt the encrypted door lock ID transmitted through the second RF signal when the antenna receives the second RF signal from the reader, and operate the opening/closing device to unlock the door when the decrypted door lock ID matches a previously assigned door lock ID.

According to the first embodiment, the server private encryption key (Priv_Server) is provisioned to the door lock management server and the memory.

According to a second embodiment, the memory further stores a master encryption key, wherein the control unit includes a random number generation unit configured to newly generate a random number based on the first RF signal to encrypt the door recognition code whenever the first RF signal is received; an encryption key generation unit configured to generate a door lock private encryption key (Priv-d) by using the random number generated from the random number generation unit, generate a door lock public encryption key (Pub_d) based on the door lock private encryption key (Priv_d), and generate a shared encryption key (S Key) by utilizing one of the door lock private encryption key (Priv-d) and the door lock public encryption key (Pub_d) and the master encryption key; and an encryption unit configured to encrypt the door recognition code stored in the memory by using the generated shared encryption key (S Key), and wherein, when receiving the first RF signal from the reader, the control unit is configured to generate the random number through the random number generation unit; generate the door lock private encryption key (Priv_d), the door lock public encryption key (Pub_d) and the shared encryption key (S Key) through the encryption key generation unit; encrypt the door recognition code with the shared encryption key (S Key) through the encryption unit; and transmit a first door packet including the encrypted door recognition code and the generated door lock public encryption key (Pub_d) to the reader through the antenna.

According to the second embodiment, the master encryption key includes one of a master private encryption key (Priv_m) and a master public encryption key (Pub_m).

According to the second embodiment, the door lock management server that receives the first door packet from the reader is configured to decrypt the encrypted door recognition code by using a own master encryption key and the received door lock public encryption key (Pub_d), and wherein the door lock management server is configured to further receive a first reader packet including an encrypted reader identification code and a reader public encryption key (Pub_rr) from the reader, in whip the door lock management server receives the first reader packet before receiving the first door packet or simultaneously receives the first reader packet and the first door packet; and decrypt the encrypted reader recognition code by using the server private encryption key (Priv_Server) and the received reader public encryption key (Pub_rr), and decrypt the encrypted door recognition code when it is determined that the decrypted reader recognition code matches a pre-stored reader recognition code.

According to the second embodiment, the encryption key generation unit is configured to refresh the door lock private encryption key (Priv_d) by using the newly generated random number such that the shared encryption key (S Key) is continuously regenerated.

According to the second embodiment, the master encryption key is provisioned to the door lock management server and the memory.

According to a third embodiment, the memory further stores a server public encryption key (Pub_Server), wherein the control unit includes a random number generation unit configured to newly generate a random number based on the first RF signal to encrypt the door recognition code whenever the first RF signal is received; an encryption key generation unit configured to generate a door lock private encryption key (Priv-d) by using the random number generated from the random number generation unit, generate a door lock public encryption key (Pub_d) based on the door lock private encryption key (Priv_d), and generate a shared encryption key (S Key) by utilizing one of the door lock private encryption key (Priv-d) and the door lock public encryption key (Pub_d) and the server private encryption key (Priv_Server); and an encryption unit configured to encrypt the door recognition code stored in the memory by using the generated shared encryption key (S Key), and wherein, when receiving the first RF signal from the reader, the control unit is configured to generate the random number through the random number generation unit; generate the door lock private encryption key (Priv_d), the door lock public encryption key (Pub_d) and the shared encryption key (S Key) through the encryption key generation unit; encrypt the door recognition code with the shared encryption key (S Key) through the encryption unit; and transmit a first door packet including the encrypted door recognition code and the generated door lock public encryption key (Pub_d) to the reader through the antenna.

According to the third embodiment, the door lock management server that receives the first door packet from the reader is configured to decrypt the encrypted door recognition code by using a server private encryption key (Priv_Server) and the received door lock public encryption key (Pub_d), wherein the door lock management server is configured to further receive a first reader packet including an encrypted reader identification code and a reader public encryption key (Pub_rr) from the reader, in which the door lock management server receives the first reader packet before receiving the first door packet or simultaneously receives the first reader packet and the first door packet; and decrypt the encrypted reader recognition code by using the server private encryption key (Priv_Server) and the received reader public encryption key (Pub_rr), and decrypt the encrypted door recognition code when it is determined that the decrypted reader recognition code matches a pre-stored reader recognition code.

According to the third embodiment, the server private encryption key (Priv_Server) is provisioned to the door lock management server and the memory.

Meanwhile, the present invention provides a door lock control device.

According to an embodiment, a device for controlling a door lock includes a communication unit communicatively connected to the door lock installed in a door and a door lock management server for managing the door lock; and a control unit configured to receive a door recognition code assigned to the door from the door lock through a first RF signal during tagging the door lock, transmit the door recognition code together with a previously assigned reader recognition code to the door lock management server, and transmit a door lock ID of the door lock provided from the door lock management server to the door lock such that the door lock is operated through a second RF signal during the tagging to unlock the door.

In addition, the present invention provides a program for controlling a door lock.

According to an embodiment, a program for controlling a door lock is stored in a medium to execute a door recognition code receiving step of activating a door recognition code receiving module so as to transmit a door recognition code together with a previously assigned reader recognition code to a door lock management server by receiving the door recognition code, which is assigned to the door lock, through a first RF signal when a user tags the door lock according to one of claims 1, 9 and 14 installed in a door; and a door lock unlocking step of activating a door lock control module such that the door lock is operated through a second RF signal during the tagging to unlock the door, wherein, in the door lock unlocking step, the door lock control module transmits the door lock ID of the door lock provided from the door lock management server to the door lock.

According to an embodiment, the program is implemented in a form of an app, wherein the app is provided to a user from the door lock management server upon a request from the before tagging the door lock, or automatically provided to the user from the door lock management server when the user tags the door lock.

In addition, the present invention provides a server for managing a door lock.

According to an embodiment, a server for managing a door lock includes a recognition code confirming unit configured to confirm whether a reader recognition code and a door recognition code transmitted simultaneously or sequentially from a reader tagging the door lock according to claim 1 match a corresponding recognition code pre-stored in a database; and an ID providing unit configured to provide a reader ID to the reader and provide a door lock ID to the door lock through the reader when it is confirmed that the reader recognition code and the door recognition code match the corresponding recognition code, wherein the recognition code confirming unit is configured to first confirm whether the transmitted reader recognition code matches the reader recognition code pre-stored in the database, and confirm whether the transmitted door recognition code matches the door recognition code pre-stored in the database when it is confirmed that the transmitted reader recognition code matches the reader recognition code.

According to an embodiment, there is provided a server for managing a door lock, wherein a reader recognition code and a door recognition code, which are transmitted simultaneously or sequentially from a reader tagging the door lock according to claim 1, are encrypted by a reader master encryption key and a door master encryption key, respectively, and wherein the server includes a database configured to store and manage each of the reader master encryption key and the door master encryption key in advance before receiving the reader master encryption key and the door master encryption key from the reader.

According to an embodiment of the present invention, the door lock includes a door lock body installed on a door and having an opening/closing device for opening and closing the door; a memory embedded in the door lock body to store a door lock identifier including a door recognition code assigned to the door and a door lock ID matched with the door recognition code; an antenna provided in the door lock body to sequentially receive a first RF signal and a second RF signal from a reader; and a control unit configured to transmit the door recognition code to the reader through the antenna such that the door recognition code together with a reader recognition code previously assigned to the reader is authenticated by a door lock management server that is communicatively connected with the reader when receiving the first RF signal, and configured to determine whether the door lock ID provided from the door lock management server through the reader matches the previously assigned door lock ID of the door lock identifier when receiving the second RF signal to control the opening/closing device such that the door is maintained in a lock state or released from the lock state.

Accordingly, the door lock having a strong security function, the door lock control device therefor, the door lock control program, and the door lock management server may be provided, and as a result, the risk of hacking may be avoided.

In addition, according to an embodiment of the present invention, it is possible to determine whether to allow access anytime, anywhere without restrictions on time and place.

For example, according to an embodiment of the present invention, a landlord who rents a lodging facility through an online lodging sharing service may avoid the hassle of resetting a password as in the related art even after a guest leaves the room.

That is, according to an embodiment of the present invention, the user may easily collect information on the door lock and release the lock setting of the corresponding door lock through a simple operation of tagging the door lock, without the operation of memorizing or inputting a recorded password.

BRIEF DESCRIPTION OF THE DRAWINGS

FIG. 1 is a conceptual diagram for explaining a door lock according to an embodiment of the present invention.

FIG. 2 is a block diagram illustrating a door lock according to a first embodiment of the present invention.

FIGS. 3 and 4 are reference diagrams for explaining the flow of information when the door lock according to the first embodiment of the present invention is tagged by a reader.

FIG. 5 is a conceptual diagram for explaining a device for controlling a door lock according to the first embodiment of the present invention.

FIG. 6 is a conceptual diagram for explaining a server for managing a door lock according to the first embodiment of the present invention.

FIG. 7 is an exemplary view illustrating a matching table stored in the database of the server for managing a door lock according to the first embodiment of the present invention.

FIGS. 8 and 9 are flowcharts for chronologically explaining a process in which the lock setting of the door lock is released in the first embodiment of the present invention.

FIG. 10 is a flowchart illustrating an operation of executing a program for controlling a door lock according to an embodiment of the present invention.

FIG. 11 is a flowchart illustrating a process in which a user app is provided to a user according to an embodiment of the present invention.

FIG. 12 is a flowchart for chronologically explaining a process in which a door recognition code is encrypted by a control unit in the first embodiment of the present invention.

FIG. 13 is a flowchart for chronologically explaining a process in which a reader recognition code and a door recognition code encrypted by the server for managing a door lock are decrypted in the first embodiment of the present invention.

FIG. 14 is a flowchart for chronologically explaining a process in which a door lock ID is decrypted and unlocked by a control unit in the first embodiment of the present invention.

FIG. 15 is a flowchart for chronologically explaining a process in which a door recognition code is encrypted by a control unit in the second embodiment of the present invention.

FIG. 16 is a flowchart for chronologically explaining a process of decrypting a reader recognition code and a door recognition code encrypted by the server for managing a door lock in the second embodiment of the present invention.

FIG. 17 is a flowchart for chronologically explaining a process in which a door recognition code is encrypted by a control unit in the third embodiment of the present invention.

FIG. 18 is a flowchart for chronologically explaining a process in which a reader recognition code and a door recognition code encrypted by the door lock management server are decrypted in a time-sequential manner in the third embodiment of the present invention.

FIG. 19 is a block diagram illustrating a door lock according to a fourth embodiment of the present invention.

FIGS. 20 and 21 are reference views for explaining the flow of information when a door lock according to the fourth embodiment of the present invention is tagged by a reader.

FIG. 22 is a flowchart for chronologically explaining a process in which a door recognition code is encrypted by a control unit in the fourth embodiment of the present invention.

FIG. 23 is a flowchart for chronologically explaining a process in which a reader recognition code and a door recognition code encrypted by the server for managing a door lock are decrypted in the fourth embodiment of the present invention.

FIG. 24 is a flowchart for chronologically explaining a process in which a door lock ID is decoded and unlocked by the control unit in the fourth embodiment of the present invention.

DETAILED DESCRIPTION OF THE INVENTION

The inventive concepts will now be described more fully hereinafter with reference to the accompanying drawings, in which exemplary embodiments of the inventive concepts are shown. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts.

It will be understood that when an element such as a layer, region or substrate is referred to as being "on" another element, it can be directly on the other element or intervening elements may be present. In addition, in the drawings, the thicknesses of layers and regions are exaggerated for clarity.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. As used herein, the term "and/or" includes any and all combinations of one or more of the associated listed items.

The terminology used herein is for the purpose of describing particular embodiments only and is not intended to limit the invention. As used herein, the singular terms "a", "an" and "the" are intended to include the plural forms as well, unless the context clearly indicates otherwise. It will be further understood that the terms "comprises", "comprising", "includes", "including", "have", "has" and/or "having" when used herein, specify the presence of stated features, integers, steps, operations, elements, and/or components, but do not preclude the presence or addition of one or more other features, integers, steps, operations, elements, components, and/or groups thereof. Furthermore, it will be understood that when an element is referred to as being "connected" or "coupled" to another element, it may be directly connected or coupled to the other element or intervening elements may be present.

In this specification, the RF signal is a broad concept including electromagnetic waves applied from the outside, and it is to be understood as a concept including any one or both signals of a signal including information and a signal not including information.

FIG. 1 is a diagram conceptually illustrating a door lock according to an embodiment of the present invention.

As shown in FIG. 1, a door lock 200 according to an embodiment of the present invention is installed on an entrance and exit door 10 provided in accommodation facilities, toilets of buildings, offices, access control areas, etc. to restrict access of unauthorized persons.

The door lock 200 is tagged by a reader 300, so that the lock setting may be released. In this case, when the door lock 200 is tagged by the reader 300, a door lock management server 400, which has collected the information on the corresponding door lock 200 and the information on the reader 300, may determine whether the information is authentic, so that the lock setting of the door lock 200 may be released when the door lock 200 is tagged by the reader 300.

In this case, the reader 300 may be, for example, a mobile phone equipped with a communication module capable of RF communication connection with the door lock 200. Accordingly, the user may open the door 100 by releasing the lock setting of the door lock 200 through a simple action of tagging his/her mobile phone operating as the reader 300 to the door lock 200 without the operation of memorizing the password and then inputting the password into the door lock 200 by the user.

According to an embodiment of the present invention, even if the authenticity of the specific door lock 200 and the reader 300 is determined by the door lock management server 400 and the lock setting of the door lock 200 can be released by tagging, when the door lock 200 is tagged with the authenticated reader 300 after a set time elapses, the lock setting of the door lock 200 is not released.

This may be particularly useful for accommodation facilities. For example, a user who has booked a lodging sharing service online may easily transmit information on the door lock 200 to the door lock management server 400 through a simple operation of tagging the door lock 200 without any operations of memorizing or inputting a recorded password into the door lock 200, thereby releasing the lock setting of the corresponding door lock 200.

In addition, a landlord who rents accommodations to a lodging sharing service online may be freed from the hassle of resetting passwords as in the past even after a guest leaves the room.

As another example, when an employee or an outsider with a low security level wants to enter the security area of a building, similarly, information on the door lock 200 may be easily transmitted to the door lock management server 400 through a simple operation of tagging the door lock 200, so that it is possible to release the lock setting of the door lock 200.

Accordingly, a security manager may be freed from the hassle of checking the identity one by one and releasing the lock setting of the door lock 200 directly.

In this case, the information of the lodging facility reservation may be transmitted to the door lock management server 400 at the step when the reservation of the accommodation facility applied online is confirmed. The information on the person entering the security area may be transmitted to the door lock management server 400 in the access permission step for the access application received online.

Accordingly, when information on the reader 300 carried by the user, such as an accommodation reservation person or a person entering a security area, is transmitted simultaneously or sequentially with the information on the door lock 200, the door lock management server 400 matches pre-stored information with the transmitted information, thereby checking the authenticity of them.

Meanwhile, the door lock 200 according to an embodiment of the present invention generates a random number by using the energy generated every time the door lock 200 is tagged by the reader 300, and encrypts the door recognition code, which is transmitted to the reader 300, with the random number. The details will be described in more detail below.

Hereinafter, a door lock according to a first embodiment of the present invention will be described with reference to FIGS. 2 to 4.

FIG. 2 is a block diagram illustrating a door lock according to a first embodiment of the present invention. FIGS. and 4 are reference diagrams illustrating the flow of information when a door lock according to the first embodiment of the present invention is tagged by a reader.

Referring to FIG. 2, the door lock 200 according to the first embodiment of the present invention, which is installed in the entrance/exit door 10 provided in an accommodation facility, a toilet of a building, an office, an entrance/exit control areas, etc., may include a door lock body 110, a memory 120, an antenna 130 and a control unit 240.

The door lock body 110 forms the external appearance of the door lock 200. The door lock body 110 is installed in the door 10, and may include an outer body installed outside the door 10 and an inner body installed inside the door 10. The door lock body 110 may include an opening/closing device (111 in FIG. 3) for opening and closing the door 10. In this case, the opening/closing device (111 in FIG. 3) may be provided as an electric deadbolt.

The memory 120 may be embedded in the door lock body 110. The memory 120 may store the door lock identifier. In this case, the door lock identifier may include the door recognition code assigned to the door 10 and the door lock ID. In the door lock identifier stored in the memory 120, the door recognition code may be encrypted by the control unit 240.

In this case, the memory 120 according to the first embodiment of the present invention may further store a server private encryption key (Priv_Server). In this case, the server private encryption key (Priv_Server) may be, for example, provisioned at the time when being released from the factory.

Such a server private encryption key (Priv_Server) is used to generate a shared encryption key (S Key) in the control unit 240, which will be described in more detail below.

The antenna 130 may be provided at one side of the door lock body 110. The antenna 130 may receive an RF signal from the reader 300. In the first embodiment of the present invention, the antenna 130 may sequentially receive the first and second RF signals from the reader 300. In this case, the antenna 130 may receive the RF signal transmitted during tagging by the reader 300.

In this case, it may be understood in a broad concept that the RF signal includes electromagnetic waves applied from an outside. That is, it may be understood that the RF signal includes one or both signals of a signal including information and a signal not including information.

For example, the RF signal may include Wi-Fi®, mobile communication, RF, Zigbee®, LoRa®, NFC, RFID, and Bluetooth communication signals.

In addition, the antenna 130 may transmit an RF signal to the reader 300 during tagging by the reader 300. Thus, the door recognition code stored in the memory 120 may be provided to the reader 300 through the RF signal transmitted to the reader 300.

When receiving the RF signal, the control unit 240 may transmit the door recognition code to the reader 300 through the antenna 130 such that the door recognition code stored in the memory 120 is authenticated by the door lock management server 400 that is communicatively connected to the reader 300.

In addition, when receiving the second RF signal, the control unit 240 may check whether the door lock ID provided from the door lock management server 400 through the reader 300 matches the door lock ID of the door lock identifier previously assigned and stored in the memory 120, and may control the opening/closing device (111 in FIG. 3) such that the door 10 is kept to be locked or unlocked.

Referring to FIG. 3, the control unit 240 according to the first embodiment of the present invention may include a random number generation unit 241, an encryption key generation unit 242, and an encryption unit 243.

The random number generation unit 241 may generate a random number based on the first RF signal received by the antenna 130. Whenever the first RF signal is received by the antenna 130, the random number generation unit 241 may newly generate a random number based on the first RF signal to encrypt the door recognition code. The random number generation unit 241 may generate a random number by using a disordered change in intensity or sensitivity of the first RF signal received in real time by the antenna 130.

In addition, the random number generation unit 241 may generate a random number based on the RF signal even when an RF signal corresponding to noise is received from the perspective of the antenna 130.

According to the first embodiment of the present invention, even the RF signal corresponding to noise to the antenna 130 may be utilized by the random number generation unit 241 for random number generation, so that the amount of random number generation and the random number generation speed may be improved.

Thus, the random number generation unit 241 according to the first embodiment of the present invention may generate a physical random number based on the first RF signal and the RF signal corresponding to noise, or alternatively, may generate the random number in an algorithmic manner. In addition, the random number generation unit 241 may generate a random number by using a circuit scheme such as a ring oscillator.

Hereinafter, it is assumed that the random number generation unit 241 generates a physical random number based on an RF signal.

The encryption key generation unit 242 may generate a door lock private encryption key (Priv_d) by using the random number generated by the random number generation unit 241.

In addition, the encryption key generation unit 242 may generate a door lock public encryption key Pub_d based on the door lock private encryption key (Priv_d). In this case, the encryption key generation unit 242 may generate a door lock public encryption key (Pub_d) based on the door lock private encryption key (Priv_d) by using a mathematical scheme, for example, an elliptic curve constant G.

In addition, the encryption key generation unit 242 may generate a shared encryption key (S Key) based on the random number generated by the random number generation unit 241. For example, the encryption key generation unit 242 may generate the shared encryption key (S Key) by using the door lock public encryption key (Pub_d) and the server private encryption key (Priv_Server) provisioned in the product releasing step.

Thus, since the shared encryption key (S Key) is generated based on the random number, it is possible to provide improved security strength.

The encryption unit 243 may encrypt the door recognition code stored in the memory 120 by using the shared encryption key (S Key) generated by the encryption key generation unit 242.

The first door packet DP1 including the encrypted door recognition code and the generated door lock public encryption key (Pub_d) may be transmitted to the reader 300 through the antenna 130. In this case, the reader 300 may first transmit the first reader packet RP1 including the encrypted reader recognition code and the generated reader public encryption key (Pub_rr) to the door lock management server 400, or may simultaneously transmit the first reader packet RP1 and the first door packet DP1 to the door lock management server 400. In this case, the reader recognition code may constitute a reader identifier together with a matching reader ID, and the reader identifier may be previously assigned to and stored in the reader 300.

Referring to FIG. 4, the control unit 240 may further include a decryption unit 244.

The decryption unit 244 may receive the encrypted door lock ID included in the second door packet DP2 transmitted through the second RF signal from the antenna 130 receiving the second RF signal from the reader 300, and decrypt it.

When the door lock ID decrypted through the decryption unit 244 matches the door lock ID of the door lock identifier stored in the memory 120, the control unit 240 may control the opening/closing device 111 to release the lock setting of the door lock 200, thereby switching the door 10 to an openable state. In this case, the matching may mean that they are equal or identical to each other.

Meanwhile, referring to FIG. 5, the door lock control device 300 acting as a reader for the door lock 200 may include a communication unit 310 and a control unit 320.

The communication unit 310 may be communicatively connected to the door lock 200 installed in the door 10 and the door lock management server 400 for managing the door lock 200.

The control unit 320 may receive the door recognition code assigned to the door 10 from the door lock 200 through the first RF signal when tagging the door lock 200 and the first door packet DP1 including the door lock public encryption key (Pub_d) through the communication unit 310, and may transmit them to the door lock management server 400.

In this case, in the previously assigned reader recognition code and the reader ID matching the reader recognition code, the control unit 320 may encrypt the reader recognition code and may first transmit the encrypted reader recognition code and the first reader packet RP1 including the generated reader public encryption key Pub_rr to the door lock management server 400 through the communication unit 310. Then, the control unit 320 may transmit the first door packet DP1 to the door lock management server 400.

In addition, the control unit 320 may transmit the first reader packet RP1 and the first door packet DP1 to the door lock management server 400 at the same time through the communication unit 310.

The control unit 320 may receive the second reader packet RP2 including the encrypted reader ID and the server public encryption key (Pub_Server) and the second door packet DP2 including the encrypted door lock ID and the server public encryption key (Pub_Server) from the door lock management server 400 through the communication unit 310.

The control unit 320 may decrypt the encrypted reader ID, and when the decrypted reader ID matches the previously assigned reader ID, transmit the second door packet DP2 to the door lock 200, thereby requesting to release the lock setting of the door lock 200.

In addition, referring to FIG. 6, the door lock management server 400 may include a recognition code confirming unit 410 and an ID providing unit 420.

The recognition code confirming unit 410 may confirm whether the reader recognition code included in the first reader packet RP1 sequentially or simultaneously transmitted from the reader tagging the door lock 200, that is, the door lock control device 300, and the door recognition code included in the first door packet DP1 match the corresponding recognition code previously collected and stored in the database DB. In this case, the matching may mean being equal or identical to each other.

Referring to FIG. 7, for example, in case where the user is a reservationer of accommodation facilities, when the reservation is confirmed on a reservation site, the reservation number, user name, period of use, accommodation location, recognition code and ID assigned to the reader carried by the user, recognition code and ID assigned to the door lock installed in the accommodation used, and the private encryption key of the door lock may be transmitted to the door lock management server 400.

Thus, the door lock management server 400 may create a matching table in the database DB and manage such reservation-specific information.

The recognition code confirming unit 410 may first confirm whether the reader recognition code transmitted from the door lock control device 300 through the first reader packet RP1 is the same as or matches the reader recognition code stored in the database DB. That is, the recognition code confirming unit 410 may check whether they match each other. In this case, when not matched, the transmitted first leader packet RP1 and the first door packet DP1 are ignored.

To the contrary, when matching, it is checked whether the door recognition code transmitted from the door lock control device 300 through the first door packet DP1 matches the door recognition code stored in the database DB. In this case, when not matched, the first door packet DP1 is ignored.

When the recognition code confirming unit 410 finally confirms that the door recognition code transmitted matches the door recognition code stored in the database DB, the ID providing unit 420 may provide the reader ID to the reader 300 and allow the door lock ID to be provided to the door lock 200 through the reader 300.

In this case, the ID providing unit 420 may encrypt the reader ID and transmit the second reader packet RP2 including the encrypted reader ID and the server public encryption key (Pub_Server) to the reader 300. In addition, the ID providing unit 420 may encrypt the door lock ID, and allow the second door packet DP2 including the encrypted door lock ID and the server public encryption key (Pub_Server) to the door lock 200 through the reader 300.

Hereinafter, a process of releasing the lock setting of a door lock will be described chronologically with reference to FIGS. 8 and 9.

First, referring to FIG. 8, in operation S1, the reader 300 may request the door recognition code through an RF signal.

Then, in operation S2, the door lock 200 may generate a random number based on the RF signal and encrypt the door recognition code based on the random number.

Next, in operation S3, the door lock 200 may transmit the first door packet including the door lock public encryption key (Pub_d) and the encrypted door recognition code to the reader 300.

Then, in operation S4, the reader 300 may encrypt the reader recognition code, and transmit the first reader packet including the encrypted reader recognition code and the reader public encryption key (Pub_rr) to the door lock management server 400. In this case, the reader 300 may first transmit the first reader packet and then transmit the first door packet. In addition, the reader 300 may simultaneously transmit the first reader packet and the first door packet.

In operation S5, when receiving the first reader packet and the first door packet from the reader 300, the door lock management server 400 may first decrypt the encrypted reader recognition code included in the first reader packet.

Next, in operation S6, the door lock management server 400 may check whether the decrypted reader recognition code matches the reader recognition code stored in the database DB.

When matched, in operation S7, the door lock management server 400 may decrypt the encrypted door recognition code included in the first door packet.

Next, in operation S8, the door lock management server 400 may check whether the decrypted door recognition code matches the door recognition code stored in the database DB.

In operation S9, when matched, the door lock management server 400 may encrypt the reader ID matching the corresponding reader recognition code, and then, encrypt the door lock ID matching the corresponding door recognition code. In addition, the door lock management server 400 may transmit the second reader packet (Pub_Server) including the server public encryption key (Pub_Server) and the encrypted reader ID and the second door packet DP2 including the server public encryption key (Pub_Server) and the encrypted door lock ID to the reader 300.

Referring to FIG. 9, in operation S9-1, the reader 300 that receives the second reader packet RP2 and the second door packet DP2 from the door lock management server 400 may decrypt the encrypted reader ID included in the second reader packet RP2.

Then, in operation S9-2, the reader 300 may check whether the decrypted reader ID matches the reader ID of the previously stored reader ID.

In case of matching, the reader 300 may transmit the second door packet DP2 to the door lock 200 through the RF signal in operation S9-3.

The door lock 200 that receives the second door packet DP2 from the reader 300 may decrypt the encrypted door lock ID included in the second door packet DP2 in operation S9-4.

Next, in operation S9-5, the door lock 200 may check whether the decrypted door lock ID matches the door lock ID of the previously stored door lock identifier.

When matched, the door lock 200 may unlock the door 10 in operation S9-6.

Hereinafter, a door lock control program according to an embodiment of the present invention will be described with reference to FIG. 10. In this case, reference numerals of respective components refer to FIGS. 1 to 7.

Referring to FIG. 10, the door lock control program according to an embodiment of the present invention may be stored in a medium to execute a door recognition code receiving operation S110 and a door lock unlocking operation S120.

First, the door lock control program according to an embodiment of the present invention may execute the door recognition code receiving operation by which the door recognition code reception module is activated, such that the door recognition code, which is assigned to the door lock 200 through the first RF signal when the user tags the door lock 200 installed in the door 10, is received and transmitted to the door lock management server 400.

Next, the door lock control program according to an embodiment of the present invention may execute the door lock unlocking operation by which the door lock control module is activated, such that the door lock 200 is operated through the second RF signal to unlock the door 10 during the tagging.

In this case, in the door lock unlocking operation, the door lock control module may transmit the door lock ID of the door lock 200 provided from the door lock management server 400 to the door lock 200. That is, the door lock unlocking operation may be an operation of requesting the door lock 200 to unlock the door 10.

The first RF and second RF signals may be transmitted and received by one tagging. In addition, the first and second RF signals may be transmitted and received by different tagging, respectively.

In this case, the door lock control device 300 may be, for example, a smart phone, the door lock control program may be stored in the smart phone, and may be implemented in the form of an app to execute the above operations.

In this case, the door lock control program implemented in the form of an app may be provided to the user from the door lock management server 400 by the user's request before tagging the door lock 200. In addition, the door lock control program implemented in the form of an app may be automatically provided to the user from the door lock management server 400 when the user tags the door lock 200.

Referring to FIG. 11, for example, when the user is a reservationer who makes a reservation for accommodation through the reservation site 500, in operation S11, the reservationer P may access the reservation site 500 and input reservationer information including the period of use, location, and personal information, thereby applying for a reservation for an accommodation facility.

Thus, the reservation site 500 may receive a reservation in operation S12 and request payment for the accommodation reservation from the reservationer P in operation S13.

When the reservationer P pays for it in operation S14, the reservation site 500 may confirm the reservation in operation S15.

After the reservation is confirmed, the reservation site 500 may provide reservation information to the door lock management server 400 in operation S16.

Thus, in operation S17, the door lock management server 400 may store reservationer information by creating a matching table in the database DB.

In this state, in operation S18, the reservationer P may request unlocking of the door lock 200 by tagging the door lock 200 installed in the accommodation facility in order to enter the accommodation facility.

The door lock management server 400 receiving a request for unlocking the door lock from the reservationer P may provide the reservationer P with the door lock control program in the form of an app and door lock information for requesting unlocking the door lock 200.

Hereinafter, with reference to FIGS. 12 to 14, a process of unlocking the door lock according to the first embodiment of the present invention will be described chronologically.

In the present specification, the public encryption key may correspond to an encryption key derived from a process based on the private encryption key. In this case, the public encryption key may be generated through the private encryption key, but to the contrary, there may be a relationship in which the private encryption key cannot be generated through the shared encryption key. That is, the relationship between the private encryption key and the public encryption key may be defined as a one-way relationship in which only the public encryption key is possible in the private encryption key.

In the present specification, the shared encryption key may be generated by a combination of the encryption keys of the server and the door lock. For example, the shared encryption key may be generated by a combination of the private encryption key or public encryption key of the server and the private encryption key or public encryption key of the door lock. In this case, the shared encryption key on the door lock side may be generated with a private encryption key of the door lock or server and a public encryption key of the door lock or server, and the shared encryption key on the server side may be generated with a private encryption key and a public encryption key not used on the door lock side. For example, when the shared encryption key on the door lock side consists of the private encryption key of the door lock and the public encryption key of the server, the shared encryption key on the server side may consist of the public encryption key of the door lock and the private encryption key of the server. That is, since the shared encryption key of the door lock side and the server side are generated with different private and public encryption keys, encryption and decryption may be performed in an asymmetric manner. Accordingly, further enhanced security may be provided.

As an operation preceding operation S41, an operation of provisioning a server private encryption key (Priv_Server) may be performed. As described above, this may mean that the same server private encryption key (Priv_Server) is stored in the memory 120 of the door lock 200 and the door lock management server 400, which may be performed at an initial setting stage, for example, when being released from a factory.

Referring to FIG. 12, when a door recognition code is requested from the reader 300 through an RF signal in operation S41, the door lock 200 may generate a new random number based on the RF signal through the random number generation unit 241 every time when receiving the RF signal in operation S42, and may provide the generated random number to the encryption key generation unit 242 in operation S43.

Next, in operation S44a, the door lock 200 may generate a door lock private encryption key (Priv_d) by using a random number through the encryption key generation unit 242.

Next, in operation S44b, the door lock 200 may generate the door lock public encryption key (Pub_d) by using the door lock private encryption key (Priv_d) through the encryption key generation unit 242.

Then, in operation S44c, the door lock 200 may generate the shared encryption key (S Key) by using the server private encryption key (Priv_Server) and the generated door lock public encryption key (Pub_d) through the encryption key generation unit 242.

As described above, since a random number is used as a seed signal of the shared encryption key (S Key), a new random number may be generated every time when an RF signal is received, and accordingly, the shared encryption key (S Key) may be newly refreshed.

Next, in operation S45, the door lock 200 may provide the shared encryption key (S Key) generated through the encryption key generation unit 242 to the encryption unit 243.

Next, the door lock 200 may encrypt the door recognition code by using the shared encryption key (S Key) through the encryption unit 243 in operation S46, and may provide the encrypted door recognition code and the door lock public encryption key (Pub_d) to the antenna 130 in operation S47.

Next, the door lock 200 may transmit the first door packet including the encrypted door recognition code and the door lock public encryption key (Pub_d) to the reader 300 through the antenna 130 in operation S48.

Subsequently, referring to FIG. 13, the reader 300, which receives the first door packet from the door lock 200 through the RF signal, may generate a reader private encryption key (Priv_rr), and generate the reader public encryption key (Pub_rr) by using the reader private encryption key (Priv_rr), generate the shared encryption key (S Key) by using the reader public encryption key (Pub_rr) and the server private encryption key (Priv_server), and encrypt the reader recognition code with the shared encryption key (S Key).

To this end, the server private encryption key (Priv_Server) may also be provisioned in the reader 300 when the door lock control program according to an embodiment of the present invention is installed. The server private encryption key (Priv_Server) installed in advance in the reader 300 may also be stored and managed in advance in the door lock management server 400.

In this case, the server private encryption key (Priv_Server) pre-installed in the reader 300 and the server private encryption key (Priv_Server) pre-installed in the door lock 200 described above with reference to FIG. 12 may be the same as or different from each other. Hereinafter, for convenience of explanation, it is assumed that the master private encryption keys that the door lock 200 and the reader 300 have in advance are different from each other.

Next, in operation S48-1, the reader 300 may transmit the first reader packet including the reader recognition code encrypted with the reader public encryption key (Pub_rr) and the shared encryption key generated by the reader 300 and the first door packet received from the door lock 200 to the door lock management server 400.

In this case, the reader 300 may transmit the first reader packet and then transmit the first door packet, or may transmit the first reader packet and the first door packet at the same time.

Accordingly, in operation S48-2, the door lock management server 400 may generate the shared encryption key (S Key) by using the server private encryption key (Priv_Server) held thereby and the provided reader public encryption key (Pub_rr).

Next, in operation S48-3, the door lock management server 400 may decrypt the received encrypted reader recognition code by using the generated shared encryption key (S Key).

Next, in operation S48-4, the door lock management server 400 may check whether the decrypted reader recognition code matches the corresponding reader recognition code stored in the database DB.

When not matched, the door lock management server 400 may ignore the first door packet.

To the contrary, when matched, in operation S48-5, the door lock management server 400 may generate the shared encryption key (S Key) by using the server private encryption key (Priv_Server) held thereby and the provided door lock public encryption key (Pub_d).

Next, in operation S48-6, the door lock management server 400 may decrypt the received encrypted door recognition code by using the generated shared encryption key (S Key).

Next, in operation S48-7, the door lock management server 400 may check whether the decrypted door recognition code matches the corresponding door recognition code stored in the database DB.

When matched, the door lock management server 400 may encrypt the reader ID matching the corresponding reader recognition code, generate the server public encryption key (Pub_Server), and transmit the second reader packet including the server public encryption key (Pub_Server) and the encrypted reader ID to the reader 300. In addition, in operation S48-8, the door lock management server 400 may encrypt the door lock ID matching the corresponding door recognition code, and transmit the second door packet including the server public encryption key (Pub_Server) and the encrypted door lock ID, together with the second reader packet, to the reader 300. In this case, the encryption may be performed through the shared encryption key generated by the door lock 200 and the reader 300, respectively. In this case, the transmission of the server public encryption key (Pub_server) may be omitted.

Referring to FIG. 14, in operation S49-1, the reader 300 may decrypt the encrypted reader ID included in the second door packet.

Next, in operation S49-2, the reader 300 may check whether the decrypted reader ID matches the reader ID of the previously assigned reader identifier.

When not matched, the reader 300 may ignore the second door packet.

To the contrary, when matched, in operation S49-3, the reader 300 may request unlocking of the door lock 200, and as a request scheme, may transmit the second door packet to the door lock 200 through an RF signal.

Accordingly, in operation S49-4, the door lock 200 may provide the second door packet received by the antenna 130 to the decryption unit 244.

Next, in operation S49-5, the door lock 200 may decrypt the encrypted door lock ID included in the second door packet through the decryption unit 244. In this case, the door lock 200 may generate the shared encryption key (S Key) by using the server public encryption key (Pub_Server) and the door lock private encryption key (Priv_d), or generate the shared encryption key (S Key) by using the server private encryption key (Priv_Server) and the door lock public encryption key (Pub_d), and may decrypt the encrypted door lock ID with the shared encryption key (S Key).

Next, in operation S49-6, the door lock 200 may check whether the decrypted door lock ID matches the door lock ID of the previously assigned door lock identifier.

In the case of matching, the door lock 200 may request the opening/closing device 111 to release the lock through the decryption unit 244 in operation S49-7, thereby operating the opening/closing device 111 to allow the door 10 to be unlocked in operation S49-8.

Hereinafter, a process of unlocking the door lock according to a second embodiment of the present invention will be described chronologically with reference to FIGS. 15 and 16.

In this case, the second embodiment of the present invention is different from the first embodiment of the present invention only in the encryption scheme, and since the components are the same, a detailed description of the same components will be omitted.

As an operation proceeding operation S41, an operation of provisioning the master private encryption key (Priv_m) may be performed. This may mean that the same master private encryption key (Priv_m) is stored in the memory 120 of the door lock 200 and the door lock management server 400 as described above. This may be performed at an initial setting stage, for example at factory shipment. In this document, the master private encryption key (Priv_m) and the master public encryption key (Pub_server) may be understood as encryption keys corresponding to the server private encryption key (Priv_server) and the server public encryption key (Pub_server), respectively, The word 'master' may mean that it is commonly used for at least two or more door locks 200 or readers 300 rather than the individual door lock 200 or reader 300. That is, since the master private encryption key (Priv_m) and the master public encryption key (Pub_server) are commonly used for a plurality of door locks 200 and readers 300, it may provide the advantage of dramatically reducing the number of required encryption keys.

Referring to FIG. 15, when a door recognition code is requested from the reader 300 through the RF signal in operation S41, the door lock 200 may generate a new random number every time when the RF signal is received through the random number generation unit 241 based on the RF signal in operation S42, and provide the generated random number to the encryption key generation unit 242 in operation S43.

Next, in operation S44a, the door lock 200 may generate the door lock private encryption key (Priv_d) by using a random number through the encryption key generation unit 242.

Next, in operation S44b, the door lock 200 may generate the door lock public encryption key (Pub_d) by using the door lock private encryption key (Priv_d) through the encryption key generation unit 242.

Then, in operation SS44c, the door lock 200 may generate the shared encryption key (S Key) by using the master private encryption key (Priv_m) and the generated door lock public encryption key (Pub_d) through the encryption key generation unit 242.

As described above, since a random number is used as a seed signal of the shared encryption key (S Key), a new random number may be generated every time when an RF signal is received, and accordingly, the shared encryption key (S Key) may be newly refreshed.

Next, in operation S45, the door lock 200 may provide the shared encryption key (S Key) generated through the encryption key generation unit 242 to the encryption unit 243.

Next, the door lock 200 may encrypt the door recognition code by using the shared encryption key (S Key) through the encryption unit 243 in operation S46, and may provide the encrypted door recognition code and the door lock public encryption key (Pub_d) to the antenna 130 in operation S47.

Next, the door lock 200 may transmit the first door packet including the encrypted door recognition code and the door lock public encryption key (Pub_d) to the reader 300 through the antenna 130 in operation S48.

Subsequently, referring to FIG. 16, the reader 300, which receives the first door packet from the door lock 200 through the RF signal, may generate a reader private encryption key (Priv_rr), and generate the reader public encryption key (Pub_rr) by using the reader private encryption key (Priv_rr), generate the shared encryption key (S Key) by using the reader public encryption key (Pub_rr) and the mater private encryption key (Priv_m), and encrypt the reader recognition code with the shared encryption key (S Key).

To this end, the master private encryption key (Priv_m) may also be provisioned in the reader 300 when the door lock control program according to an embodiment of the present invention is installed. The master personal encryption key (Priv_m) installed in advance in the reader 300 may also be stored and managed in advance in the door lock management server 400.

In this case, the master private encryption key (Priv_m) previously installed in the reader 300 and the master private encryption key (Priv_m) previously installed in the door lock 200 described above with reference to FIG. 15 may be the same as or different from each other. Hereinafter, for convenience of explanation, it is assumed that the master private encryption keys that the door lock 200 and the reader 300 have in advance are different from each other.

Next, in operation S48-1, the reader 300 may transmit the first reader packet including the reader recognition code encrypted with the reader public encryption key (Pub_rr) and the shared encryption key generated by the reader 300 and the first door packet received from the door lock 200 to the door lock management server 400.

In this case, the reader 300 may transmit the first reader packet and then transmit the first door packet, or may transmit the first reader packet and the first door packet at the same time.

Accordingly, in operation S48-2, the door lock management server 400 may generate the shared encryption key (S Key) by using the master private encryption key (Priv_m) held thereby and the provided reader public encryption key (Pub_rr).

Next, in operation S48-3, the door lock management server 400 may decrypt the received encrypted reader recognition code by using the generated shared encryption key (S Key).

Next, in operation S48-4, the door lock management server 400 may check whether the decrypted reader recognition code matches the corresponding reader recognition code stored in the database DB.

When not matched, the door lock management server 400 may ignore the first door packet.

To the contrary, when matched, in operation S48-5, the door lock management server 400 may generate the shared encryption key (S Key) by using the master private encryption key (Priv_m) held thereby and the provided door lock public encryption key (Pub_d).

Next, in operation S48-6, the door lock management server 400 may decrypt the received encrypted door recognition code by using the generated shared encryption key (S Key).

Next, in operation S48-7, the door lock management server 400 may check whether the decrypted door recognition code matches the corresponding door recognition code stored in the database DB.

When matched, the door lock management server 400 may encrypt the reader ID matching the corresponding reader recognition code, generate the server public encryption key (Pub_Server), and transmit the second reader packet including the server public encryption key (Pub_Server) and the encrypted reader ID to the reader 300. In addition, in operation S48-8, the door lock management server 400 may encrypt the door lock ID matching the corresponding door recognition code, and transmit the second door packet including the server public encryption key (Pub_Server) and the encrypted door lock ID, together with the second reader packet, to the reader 300. In this case, the encryption may be performed through the shared encryption key generated by the door lock 200 and the reader 300, respectively. In this case, the transmission of the server public encryption key (Pub_server) may be omitted.

Meanwhile, as a modified example, the door lock management server 400 may decrypt the received encrypted reader recognition code and the encrypted door recognition code by using only the master private encryption key (Priv_m).

In addition, as another modified example, as a preliminary operation, an operation of provisioning the master public encryption key (Pub_m) may be performed.

Accordingly, when receiving a request for a door recognition code from the reader 300 through the RF signal, the door lock 200 may generate a new random number every time when the RF signal is received, based on the RF signal, through the random number generation unit 241, and provide the generated random number to the encryption key generation unit 242.

Next, the door lock 200 may generate the door lock private encryption key (Priv_d) by using a random number through the encryption key generation unit 242.

Next, the door lock 200 may generate the door lock public encryption key (Pub_d) by using the door lock private encryption key (Priv_d) through the encryption key generation unit 242.

Then, the door lock 200 may generate the shared encryption key (S Key) by using the master private encryption key (Priv_m) and the generated door lock public encryption key (Pub_d) through the encryption key generation unit 242.

As described above, since a random number is used as a seed signal of the shared encryption key (S Key), a new random number may be generated every time when an RF signal is received, and accordingly, the shared encryption key (S Key) may be newly refreshed.

Next, the door lock 200 may provide the shared encryption key (S Key) generated through the encryption key generation unit 242 to the encryption unit 243.

Next, the door lock 200 may encrypt the door recognition code by using the shared encryption key (S Key) through the encryption unit 243 in operation S46, and may provide the encrypted door recognition code and the door lock public encryption key (Pub_d) to the antenna 130.

Next, the door lock 200 may transmit the first door packet including the encrypted door recognition code and the door lock public encryption key (Pub_d) to the reader 300 through the antenna 130.

The reader 300, which receives the first door packet from the door lock 200 through the RF signal, may generate a reader private encryption key (Priv_rr), and generate the reader public encryption key (Pub_rr) by using the reader private encryption key (Priv_rr), generate the shared encryption key (S Key) by using the reader private encryption key (Priv_rr) and the mater public encryption key (Pub_m), and encrypt the reader recognition code with the shared encryption key (S Key).

Then, the reader 300 may transmit the first reader packet including the reader public encryption key (Pub_rr) and the encrypted reader recognition code and the first door packet received from the door lock 200 to the door lock management server 400.

In this case, the reader 300 may transmit the first reader packet and then transmit the first door packet, or may transmit the first reader packet and the first door packet at the same time.

Accordingly, the door lock management server 400 may generate the shared encryption key (S Key) by using the master public encryption key (Pub_m) held thereby and the provided reader public encryption key (Pub_rr).

Next, the door lock management server 400 may decrypt the received encrypted reader recognition code by using the generated shared encryption key (S Key).

Next, the door lock management server 400 may check whether the decrypted reader recognition code matches the corresponding reader recognition code stored in the database DB.

When not matched, the door lock management server 400 may ignore the first door packet.

To the contrary, when matched, the door lock management server 400 may generate the shared encryption key (S Key) by using the master public encryption key (Pub_m) held thereby and the provided door lock public encryption key (Pub_d).

Next, the door lock management server 400 may decrypt the received encrypted door recognition code by using the generated shared encryption key (S Key).

Next, the door lock management server 400 may check whether the decrypted door recognition code matches the corresponding door recognition code stored in the database DB.

When matched, the door lock management server 400 may encrypt the reader ID matching the corresponding reader recognition code, generate the server public encryption key (Pub_Server), and transmit the second reader packet including the server public encryption key (Pub_Server) and the encrypted reader ID to the reader 300. In addition, the door lock management server 400 may encrypt the door lock ID matching the corresponding door recognition code, and transmit the second door packet including the server public encryption key (Pub_Server) and the encrypted door lock ID, together with the second reader packet, to the reader 300.

Meanwhile, since the following transmission process between the reader 300 and the door lock 200 is the same as the first embodiment of the present invention, a detailed description thereof will be omitted.

Hereinafter, a process of unlocking the door lock according to a third embodiment of the present invention will be described chronologically with reference to FIGS. 17 and 18.

In this case, the third embodiment of the present invention is different from the first embodiment of the present invention only in the encryption scheme, and since the components are the same, a detailed description of the same components will be omitted.

As an operation preceding operation S41, an operation of provisioning a server public encryption key (Pub_Server) may be performed. As described above, this may mean that the same server public encryption key (Pub_Server) is stored in the memory 120 of the door lock 200 and the door lock management server 400, which may be performed at an initial setting stage, for example, when being released from a factory.

Referring to FIG. 17, when a door recognition code is requested from the reader 300 through an RF signal in operation S41, the door lock 200 may generate a new random number based on the RF signal through the random number generation unit 241 every time when receiving the RF signal in operation S42, and may provide the generated random number to the encryption key generation unit 242 in operation S43.

Next, in operation S44a, the door lock 200 may generate a door lock private encryption key (Priv_d) by using a random number through the encryption key generation unit 242.

Next, in operation S44b, the door lock 200 may generate the door lock public encryption key (Pub_d) by using the door lock private encryption key (Priv_d) through the encryption key generation unit 242.

Then, in operation S44c, the door lock 200 may generate the shared encryption key (S Key) by using the server private encryption key (Priv_Server) and the generated door lock public encryption key (Pub_d) through the encryption key generation unit 242.

As described above, since a random number is used as a seed signal of the shared encryption key (S Key), a new random number may be generated every time when an RF signal is received, and accordingly, the shared encryption key (S Key) may be newly refreshed.

Next, in operation S45, the door lock 200 may provide the shared encryption key (S Key) generated through the encryption key generation unit 242 to the encryption unit 243.

Next, the door lock 200 may encrypt the door recognition code by using the shared encryption key (S Key) through the encryption unit 243 in operation S46, and may provide the encrypted door recognition code and the door lock public encryption key (Pub_d) to the antenna 130 in operation S47.

Next, the door lock 200 may transmit the first door packet including the encrypted door recognition code and the door lock public encryption key (Pub_d) to the reader 300 through the antenna 130 in operation S48.

Subsequently, referring to FIG. 18, the reader 300, which receives the first door packet from the door lock 200 through the RF signal, may generate the reader private encryption key (Priv_rr), and generate the reader public encryption key (Pub_rr) by using the reader private encryption key (Priv_rr).

In addition, the reader 300 may generate the shared encryption key (S Key) by using the reader public encryption key (Pub_rr) and the server public encryption key (Pub_server), and encrypt the reader recognition code with the shared encryption key (S Key).

To this end, the server public encryption key (Pub_Server) may be provisioned in the reader 300 when the door lock control program according to an embodiment of the present invention is installed. The server public encryption key (Pub_Server) installed in advance in the reader 300 may also be stored and managed in advance in the door lock management server 400.

In this case, the server public encryption key (Pub_Server) pre-installed in the reader 300 and the server public encryption key (Pub_Server) pre-installed in the door lock 200 described above with reference to FIG. 12 may be the same as or different from each other. Hereinafter, for convenience of explanation, it is assumed that the master private encryption keys that the door lock 200 and the reader 300 have in advance is different from each other.

Next, in operation S48-1, the reader 300 may transmit the first reader packet including the reader recognition code encrypted with the reader public encryption key (Pub_rr) and the shared encryption key generated by the reader 300 and the first door packet received from the door lock 200 to the door lock management server 400.

In this case, the reader 300 may transmit the first reader packet and then transmit the first door packet, or may transmit the first reader packet and the first door packet at the same time.

Accordingly, in operation S48-2, the door lock management server 400 may generate the shared encryption key (S Key) by using the server private encryption key (Priv_Server) previously held thereby and the provided reader public encryption key (Pub_rr).

Next, in operation S48-3, the door lock management server 400 may decrypt the received encrypted reader recognition code by using the generated shared encryption key (S Key).

Next, in operation S48-4, the door lock management server 400 may check whether the decrypted reader recognition code matches the corresponding reader recognition code stored in the database DB.

When not matched, the door lock management server 400 may ignore the first door packet.

To the contrary, when matched, in operation S48-5, the door lock management server 400 may generate the shared encryption key (S Key) by using the server private encryption key (Priv_Server) held thereby and the provided door lock public encryption key (Pub_d).

Next, in operation S48-6, the door lock management server 400 may decrypt the received encrypted door recognition code by using the generated shared encryption key (S Key).

Next, in operation S48-7, the door lock management server 400 may check whether the decrypted door recognition code matches the corresponding door recognition code stored in the database DB.

When matched, the door lock management server 400 may encrypt the reader ID matching the corresponding reader recognition code, generate the server public encryption key (Pub_Server), and transmit the second reader packet including the server public encryption key (Pub_Server) and the encrypted reader ID to the reader 300. In addition, in operation S48-8, the door lock management server 400 may encrypt the door lock ID matching the corresponding door recognition code, and transmit the second door packet including the server public encryption key (Pub_Server) and the encrypted door lock ID, together with the second reader packet, to the reader 300.

In more detail, the door lock management server 400 may generate the shared encryption key by using the server private encryption key (Priv_server) and the reader public encryption key (Pub_rr) for encryption of operation S48-8, and thus, may encrypt the first door packet. In addition, the door lock management server 400 may generate the shared encryption key by using the server private encryption key (Priv_server) and the door lock public encryption key (Pub_d), and thus, may encrypt the second door packet. Of course, the door lock management server 400 may encrypt the shared encryption key generated by the door lock 200 and the reader 300 again, and in this case, it is possible to omit the transmission of the server public encryption key (Pub_server) to the door lock 200 and the reader 300 by the door lock management server 400.

Meanwhile, since the following transmission process between the reader 300 and the door lock 200 is the same as the first embodiment of the present invention, the detailed description thereof will be omitted.

TABLE 1

| Definition | Door lock | Server |
| --- | --- | --- |
| First embodiment; Scheme of generating S Key | Pub_d + Priv_Server* | Pub_d + Priv_Server |
| Second embodiment; Scheme of generating S Key | Pub_d + Master* | Pub_d + Master* |
| Third embodiment; Scheme of generating S Key | Priv_d + Pub_Server* | Pub_d + Priv_Server* |

Where * is a pre-existing value.

In summary, as shown in Table 1, in the first embodiment, the shared encryption key (S Key) of each of the door lock and the server may be generated through the door lock public encryption key (Pub_d) and the server private encryption key (Priv_Server).

In addition, in the second embodiment, the shared encryption key (S Key) of each of the door lock and the server may be generated through the server public encryption key (Pub_d) and the master encryption key (Master).

In addition, in the third embodiment, the shared encryption key (S Key) of the door lock may be generated through the door lock private encryption key (Priv_d) and the server public encryption key (Pub_Server), and the shared encryption key (S Key) of the server may be generated through the door lock public encryption key (Pub_d) and the server private encryption key (Priv_Server).

In this case, the random number may be the same as the encryption key. In the present invention, encryption may be understood as a concept including encryption with a random number as well as encryption with an encryption key. In another aspect, the random number generation unit and the encryption key generation unit may have the same configuration.

Hereinafter, a door lock according to a fourth embodiment of the present invention will be described with reference to FIGS. 19 to 21.

FIG. 19 is a block diagram illustrating a door lock according to a fourth embodiment of the present invention. FIGS. 20 and 21 are reference views illustrating the flow of information when a door lock according to a fourth embodiment of the present invention is tagged by a reader.

Referring to FIG. 19, the door lock 100 according to a fourth embodiment of the present invention may include the door lock body 110, the memory 120, the antenna 130, and the control unit 140.

The door lock body 110 forms the external appearance of the door lock 200. The door lock body 110 is installed in the door 10, and may include an outer body installed outside the door 10 and an inner body installed inside the door 10. The door lock body 110 may include an opening/closing device (111 in FIG. 20) for opening and closing the door 10. In this case, the opening/closing device (111 in FIG. 20) may be provided as an electric deadbolt.

The memory 120 may be embedded in the door lock body 110. The memory 120 may store a door lock identifier including a door recognition code assigned to the door 10 and a door lock ID matching the same. The door recognition code stored in the memory 120 may be encrypted by the control unit 140.

The antenna 130 may be provided at one side of the door lock body 110. The antenna 130 may receive an RF signal from the reader 300. In the fourth embodiment of the present invention, the antenna 130 may sequentially receive the first and second RF signals from the reader 300. In this case, the antenna 130 may receive the RF signal transmitted during tagging by the reader 300.

In this case, it may be understood in a broad concept that the RF signal includes electromagnetic waves applied from an outside. That is, it may be understood that the RF signal includes one or both signals of a signal including information and a signal not including information.

In addition, the antenna 130 may transmit an RF signal to the reader 300 during tagging by the reader 300. Thus, the door recognition code stored in the memory 120 may be provided to the reader 300 through the RF signal transmitted to the reader 300.

When receiving the RF signal, the control unit 240 may transmit the door recognition code to the reader 300 through the antenna 130 such that the door recognition code stored in the memory 120 is authenticated by the door lock management server 400 that is communicatively connected to the reader 300.

In addition, when receiving the second RF signal, the control unit 240 may check whether the door lock ID provided from the door lock management server 400 through the reader 300 matches the door lock ID of the door lock identifier previously assigned and stored in the memory 120, and may control the opening/closing device (111 in FIG. 20) such that the door 10 is kept to be locked or unlocked.

Referring to FIG. 20, the control unit 240 according to the first embodiment of the present invention may include the random number generation unit 241, the encryption key generation unit 242, and the encryption unit 243.

The random number generation unit 241 may generate a random number based on the first RF signal received by the antenna 130. Whenever the first RF signal is received by the antenna 130, the random number generation unit 241 may newly generate a random number based on the first RF signal to encrypt the door recognition code. The random number generation unit 241 may generate a random number by using a disordered change in intensity or sensitivity of the first RF signal received in real time by the antenna 130.

In addition, the random number generation unit 241 may generate a random number based on the RF signal even when an RF signal corresponding to noise is received from the perspective of the antenna 130.

According to the fourth embodiment of the present invention, even the RF signal corresponding to noise to the antenna 130 may be utilized by the random number generation unit 241 for random number generation, so that the amount of random number generation and the random number generation speed may be improved.

Thus, the random number generation unit 141 according to the fourth embodiment of the present invention may generate a physical random number based on the first RF signal and the RF signal corresponding to noise, or alternatively, may generate the random number in an algorithmic manner. In addition, the random number generation unit 241 may generate a random number by using a circuit scheme such as a ring oscillator.

Hereinafter, it is assumed that the random number generation unit 241 generates a physical random number based on an RF signal.

The encryption key generation unit 142 may generate an encryption key by using the random number generated by the random number generation unit 141.

The encryption unit 143 may encrypt the door recognition code stored in the memory 120 using the encryption key generated by the encryption key generation unit 142.

Referring to FIG. 21, the control unit 140 may further include a decryption unit 144.

The decryption unit 144 may receive the encrypted door lock ID included in the second door packet DP2 transmitted through the second RF signal from the antenna 130 receiving the second RF signal from the reader 300, and decrypt it.

When the door lock ID decrypted through the decryption unit 144 matches the door lock ID of the door lock identifier stored in the memory 120, the control unit 240 may control the opening/closing device 111 to release the lock setting of the door lock 100, thereby switching the door 10 to an openable state.

Hereinafter, a process of unlocking the door lock according to the fourth embodiment of the present invention will be described chronologically with reference to FIGS. 22 to 24.

Referring to FIG. 22, when a door recognition code is requested from the reader 300 through an RF signal in operation S51, the door lock 100 may generate a new random number based on the RF signal through the random number generation unit 141 every time when receiving the RF signal in operation S52, and may provide the generated random number to the encryption key generator 142 in operation S53.

Next, the door lock 100 may generate an encryption key by using the random number through the encryption key generation unit 142 in operation S54, and provide the generated encryption key to the encryption unit 143 in operation S55.

Then, the door lock 100 may encrypt the door recognition code with the encryption key through the encryption unit 143 in operation S56, and transmit the encrypted door recognition code and the encryption key to the reader 300 through the antenna 130 in operations S57 and S58.

Referring to FIG. 23, in operation S59, the reader 300, which receives the encryption key and the encrypted door recognition code from the door lock 100 through the RF signal, may use the encryption key to encrypt the reader recognition code and then, transmit the encrypted reader recognition code, the encrypted door recognition code and the encryption key to the door lock management server 400.

Accordingly, in operation S59-1, the door lock management server 400 may use the encryption key to decrypt the received encrypted reader recognition code.

Next, in operation S59-2, the door lock management server 400 may check whether the decrypted reader recognition code matches the corresponding reader recognition code stored in the database DB.

When not matched, the door lock management server 400 may ignore the encrypted door recognition code.

To the contrary, when matched, in operation S59-3, the door lock management server 400 may decrypt the received encrypted door recognition code by using the encryption key.

Next, in operation S59-4, the door lock management server 400 may check whether the decrypted door recognition code matches the corresponding door recognition code stored in the database DB.

When matched, in operation S59-5, the door lock management server 400 may use the encryption key to encrypt the reader ID matching the corresponding reader recognition code and the door lock ID matching the corresponding door recognition code, and then transmit it to the reader 300.

Referring to FIG. 24, the reader 300 may decrypt the encrypted reader ID in operation S61.

Next, in operation S62, the reader 300 may check whether the decrypted reader ID matches the reader ID of the previously assigned reader identifier.

In the case of matching, in operation S63, the reader 300 may request unlocking of the door lock 100, and as a request scheme, may transmit the encrypted door lock ID provided from the door lock management server 400 through the RF signal to the door lock 100.

Accordingly, in operation S64, the door lock 100 may provide the encrypted door lock ID received through the antenna 130 to the decryption unit 144.

Next, in operation S65, the door lock 100 may decrypt the encrypted door lock ID through the decryption unit 144.

Next, in operation S66, the door lock 100 may check whether the decrypted door lock ID matches the door lock ID of the previously assigned door lock identifier.

In case of matching, the door lock 100 may request the opening/closing device 111 to release the lock through the decryption unit 144 in operation S67, and may operate the opening/closing device 111 so that the door 10 is unlocked in operation S68.

In explaining encryption/decryption according to the first to fourth embodiments of the present invention, it is assumed that the shared encryption key for encryption/decryption between the door lock 200 and the door management server 400, and the shared encryption key for encryption/decryption between the reader 300 and the door management server 400 are utilized. Alternatively, the shared encryption key for encryption/decryption between the reader 300 and the door management server 400 may be omitted. In this case, the encryption key required for communication between the reader 300 and the door management server 400 may be replaced with a shared encryption key for encryption/decryption between the door lock 200 and the door management server 400.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A door lock comprising:
   a door lock body installed on a door and having an opening/closing device for opening and closing the door;
   a memory embedded in the door lock body to store a door lock identifier including a door recognition code assigned to the door and a door lock identification (ID) corresponding to the door recognition code;
   an antenna provided in the door lock body to sequentially receive a first radio frequency (RF) signal and a second RF signal from a reader; and
   a control unit configured to transmit when the door lock receives the first RF, the door recognition code to the reader through the antenna such that the door recognition code together with a reader recognition code previously assigned to the reader is authenticated by a door lock management server that is communicatively connected with the reader and configured to determine, when the door lock receives the second RF, whether the door lock ID provided from the door lock management server through the reader matches the previously assigned door lock ID of the door lock identifier to control the opening/closing device such that the door is maintained in a lock state or released from the lock state,
   wherein authentication to the door recognition code is determined according to an authentication result of the reader recognition code by the door lock management server,
   wherein the memory further stores a server private encryption key (Priv_Server),
   wherein the control unit includes:
   a random number generation unit configured to newly generate a random number based on the first RF signal to encrypt the door recognition code whenever the first RF signal is received;
   an encryption key generation unit configured to generate a door lock private encryption key (Priv-d) by using the random number generated from the random number generation unit, generate a door lock public encryption key (Pub_d) based on the door lock private encryption key (Priv_d), and generate a shared encryption key (S Key) by utilizing one of the door lock private encryption key (Priv-d) and the door lock public encryption key (Pub_d) and the server private encryption key (Priv_Server); and
   an encryption unit configured to encrypt the door recognition code stored in the memory by using the generated shared encryption key (S Key), and
   wherein, when receiving the first RF signal from the reader, the control unit is configured to:
   generate the random number through the random number generation unit;
   generate the door lock private encryption key (Priv_d), the door lock public encryption key (Pub_d) and the shared encryption key (S Key) through the encryption key generation unit;
   encrypt the door recognition code with the shared encryption key (S Key) through the encryption unit; and
   transmit a first door packet including the encrypted door recognition code and the generated door lock public encryption key (Pub_d) to the reader through the antenna.

2. The door lock of claim 1, wherein the door lock management server that receives the first door packet from the reader is configured to decrypt the encrypted door recognition code by using the server private encryption key (Priv_Server) and the received door lock public encryption key (Pub_d).

3. The door lock of claim 2, wherein the door lock management server further receives a first reader packet including an encrypted reader identification code and a reader public encryption key (Pub_rr) from the reader, in which the door lock management server receives the first reader packet before receiving the first door packet, or simultaneously receives the first reader packet and the first door packet.

4. The door lock of claim 3, wherein the door lock management server is configured to decrypt an encrypted reader recognition code by using the server private encryption key (Priv_Server) and the received reader public encryption key (Pub_rr), and decrypt the encrypted door recognition code when it is determined that the decrypted reader recognition code matches a pre-stored reader recognition code.

5. The door lock of claim 4, wherein the door lock management server is configured to provide a second reader packet including a server public encryption key (Pub_Server) and an encrypted reader ID and a second door packet including theft server public encryption key (Pub_Server) and an encrypted door lock ID to the reader, and
  wherein the reader is configured to decrypt the encrypted reader ID by using the server public encryption key (Pub_Server) and the reader private encryption key (Priv_rr), and
  transmit the second door packet to the antenna through the second RF signal during tagging when the decrypted reader ID matches a previously assigned reader ID.

6. The door lock of claim 5, wherein the control unit is configured to decrypt the encrypted door lock ID transmitted through the second RF signal when the antenna receives the second RF signal from the reader, and
  operate the opening/closing device to unlock the door when the decrypted door lock ID matches a previously assigned door lock ID.

7. The door lock of claim 1, wherein the server private encryption key (Priv_Server) is provisioned to the door lock management server and the memory.

8. A door lock comprising:
  a door lock body installed on a door and having an opening/closing device for opening and closing the door;
  a memory embedded in the door lock body to store a door lock identifier including a door recognition code assigned to the door and a door lock identification (ID) corresponding to the door recognition code;
  an antenna provided in the door lock body to sequentially receive a first radio frequency (RF) signal and a second RF signal from a reader; and
  a control unit configured to transmit, when the door lock receives the first RF, the door recognition code to the reader through the antenna such that the door recognition code together with a reader recognition code previously assigned to the reader is authenticated by a door lock management server that is communicatively connected with the reader and configured to determine, when the door lock receives the second RF, whether the door lock ID provided from the door lock management server through the reader matches the previously assigned door lock ID of the door lock identifier to control the opening/closing device such that the door is maintained in a lock state or released from the lock state,
  wherein authentication to the door recognition code is determined according to an authentication result of the reader recognition code by the door lock management server,
  wherein the memory further stores a master encryption key,
  wherein the control unit includes:
  a random number generation unit configured to newly generate a random number based on the first RF signal to encrypt the door recognition code whenever the first RF signal is received;
  an encryption key generation unit configured to generate a door lock private encryption key (Priv-d) by using the random number generated from the random number generation unit, generate a door lock public encryption key (Pub_d) based on the door lock private encryption key (Priv_d), and generate a shared encryption key (S Key) by utilizing one of the door lock private encryption key (Priv-d) and the door lock public encryption key (Pub_d) and the master encryption key; and
  an encryption unit configured to encrypt the door recognition code stored in the memory by using the generated shared encryption key (S Key), and
  wherein, when receiving the first RF signal from the reader, the control unit is configured to:
  generate the random number through the random number generation unit;
  generate the door lock private encryption key (Priv_d), the door lock public encryption key (Pub_d) and the shared encryption key (S Key) through the encryption key generation unit;
  encrypt the door recognition code with the shared encryption key (S Key) through the encryption unit; and
  transmit a first door packet including the encrypted door recognition code and the generated door lock public encryption key (Pub_d) to the reader through the antenna.

9. The door lock of claim 8, wherein the master encryption key includes one of a master private encryption key (Priv_m) and a master public encryption key (Pub_m).

10. The door lock of claim 8, wherein the door lock management server that receives the first door packet from the reader is configured to decrypt the encrypted door recognition code by using a Master encryption key and the received door lock public encryption key (Pub_d), and
  wherein the door lock management server is configured to further receive a first reader packet including an encrypted reader identification code and a reader public encryption key (Pub_rr) from the reader, in which the door lock management server receives the first reader packet before receiving the first door packet or simultaneously receives the first reader packet and the first door packet; and
  decrypt the encrypted reader recognition code by using the server private encryption key (Priv_Server) and the received reader public encryption key (Pub_rr), and decrypt the encrypted door recognition code when it is determined that the decrypted reader recognition code matches a pre-stored reader recognition code.

11. The door lock of claim 8, wherein the encryption key generation unit is configured to refresh the door lock private encryption key (Priv_d) by using the newly generated random number such that the shared encryption key (S Key) is continuously regenerated.

12. The door lock of claim 8, wherein the master encryption key is provisioned to the door lock management server and the memory.

13. A door lock comprising:
a door lock body installed on a door and having an opening/closing device for opening and closing the door;
a memory embedded in the door lock body to store a door lock identifier including a door recognition code assigned to the door and a door lock identification (ID) corresponding to the door recognition code;
an antenna provided in the door lock body to sequentially receive a first radio frequency (RF) signal and a second RF signal from a reader; and
a control unit configured to transmit, when the door lock receives the first RF, the door recognition code to the reader through the antenna such that the door recognition code together with a reader recognition code previously assigned to the reader is authenticated by a door lock management server that is communicatively connected with the reader and configured to determine, when the door lock receives the second RF, whether the door lock ID provided from the door lock management server through the reader matches the previously assigned door lock ID of the door lock identifier to control the opening/closing device such that the door is maintained in a lock state or released from the lock state,
wherein authentication to the door recognition code is determined according to an authentication result of the reader recognition code by the door lock management server,
wherein the memory further stores a server public encryption key (Pub_Server),
wherein the control unit includes:
a random number generation unit configured to newly generate a random number based on the first RF signal to encrypt the door recognition code whenever the first RF signal is received;
an encryption key generation unit configured to generate a door lock private encryption key (Priv-d) by using the random number generated from the random number generation unit, generate a door lock public encryption key (Pub_d) based on the door lock private encryption key (Priv_d), and generate a shared encryption key (S Key) by utilizing one of the door lock private encryption key (Priv-d) and the door lock public encryption key (Pub_d) and the server private encryption key (Priv_Server); and
an encryption unit configured to encrypt the door recognition code stored in the memory by using the generated shared encryption key (S Key), and
wherein, when receiving the first RF signal from the reader, the control unit is configured to:
generate the random number through the random number generation unit;
generate the door lock private encryption key (Priv_d), the door lock public encryption key (Pub_d) and the shared encryption key (S Key) through the encryption key generation unit;
encrypt the door recognition code with the shared encryption key (S Key) through the encryption unit; and
transmit a first door packet including the encrypted door recognition code and the generated door lock public encryption key (Pub_d) to the reader through the antenna.

14. The door lock of claim 13, wherein the door lock management server that receives the first door packet from the reader is configured to decrypt the encrypted door recognition code by using a server private encryption key (Priv_Server) and the received door lock public encryption key (Pub_d),
wherein the door lock management server is configured to further receive a first reader packet including an encrypted reader identification code and a reader public encryption key (Pub_rr) from the reader, in which the door lock management server receives the first reader packet before receiving the first door packet or simultaneously receives the first reader packet and the first door packet; and
decrypt the encrypted reader recognition code by using the server private encryption key (Priv_Server) and the received reader public encryption key (Pub_rr), and decrypt the encrypted door recognition code when it is determined that the decrypted reader recognition code matches a pre-stored reader recognition code.

15. The door lock of claim 13, wherein the server private encryption key (Priv_Server) is provisioned to the door lock management server and the memory.

16. A non-transitory computer readable recording medium storing a program for controlling a door lock, which executes:
a door recognition code receiving step of activating a door recognition code receiving module, wherein the door recognition code receiving module (1) receives a door recognition code assigned to the door lock through a first RF signal when a user tags the door lock according to claim 1, and (2) transmits the door recognition code together with a previously assigned reader recognition code to a door lock management server by; and
a door lock unlocking step of activating a door lock control module such that the door lock is operated through a second RF signal during the tagging to unlock the door,
wherein, in the door lock unlocking step, the door lock control module transmits the door lock ID of the door lock provided from the door lock management server to the door lock, and
wherein authentication to the door recognition code is determined according to an authentication result of the reader recognition code by the door lock management server.

17. The program of claim 16, wherein the program is implemented in a form of an app, and
wherein the app is provided to a user from the door lock management server upon a request from the user before tagging the door lock, or automatically provided to the user from the door lock management server when the user tags the door lock.

18. A server for managing a door lock, the server comprising:
a recognition code confirming unit configured to confirm whether a reader recognition code and a door recognition code transmitted simultaneously or sequentially from a reader tagging the door lock according to claim 1 match a corresponding recognition code pre-stored in a database; and
an ID providing unit configured to provide a reader ID to the reader and provide a door lock ID to the door lock through the reader when it is confirmed that the reader recognition code and the door recognition code match the corresponding recognition code, and wherein the recognition code confirming unit is configured to first confirm whether the transmitted reader recognition code matches a reader recognition code pre-stored in the database, and confirm whether the transmitted door recognition code matches the door recognition code pre-stored in the database when it is confirmed that the transmitted reader recognition code matches the reader recognition code.

19. A server for managing a door lock, wherein a reader recognition code and a door recognition code, which are transmitted simultaneously or sequentially from a reader tagging the door lock according to claim 1, are encrypted by a reader master encryption key and a door master encryption key, respectively, and wherein the server includes a database configured to store and manage each of the reader master encryption key and the door master encryption key in advance before receiving the reader master encryption key and the door master encryption key from the reader.

* * * * *